(12) United States Patent
Cheung et al.

(10) Patent No.: US 6,376,095 B1
(45) Date of Patent: Apr. 23, 2002

(54) ELASTIC FILMS MADE FROM ALPHA-OLEFIN/VINYL AROMATIC AND/OR ALIPHATIC OR CYCLOALIPHATIC VINYL OR VINYLIDENE INTERPOLYMERS

(75) Inventors: Yunwa W. Cheung; Martin J. Guest; William R. Van Volkenburgh, all of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/317,390

(22) Filed: May 24, 1999

Related U.S. Application Data
(60) Provisional application No. 60/088,974, filed on Jun. 11, 1998.

(51) Int. Cl.$^7$ ............................................. B32B 27/37
(52) U.S. Cl. ..................... 428/516; 428/517; 428/521; 525/240; 525/241; 526/347; 526/348; 526/943
(58) Field of Search ........................... 428/517, 516, 428/521, 523; 526/943, 348, 347.1, 347; 525/240, 241

(56) References Cited

U.S. PATENT DOCUMENTS

| | | | |
|---|---|---|---|
| 2,957,512 A | 10/1960 | Wade et al. | 154/33.05 |
| 3,849,241 A | 11/1974 | Butin et al. | 161/169 |
| 4,076,698 A | 2/1978 | Anderson et al. | 526/348.6 |
| 4,798,081 A | 1/1989 | Hazlitt et al. | 73/53 |
| 4,801,482 A | 1/1989 | Goggans et al. | 428/68 |
| 4,803,117 A | 2/1989 | Daponte | 428/228 |
| 4,861,652 A | 8/1989 | Lippert et al. | 428/284 |
| 4,938,757 A | 7/1990 | Van Gompel et al. | 604/396 |
| 4,938,759 A | 7/1990 | Van Gompel et al. | 604/385.2 |
| 4,940,464 A | 7/1990 | Van Gompel et al. | 604/396 |
| 4,981,747 A | 1/1991 | Morman | 428/198 |
| 5,008,204 A | 4/1991 | Stehling | 436/85 |
| 5,037,416 A | 8/1991 | Allen et al. | 604/385.1 |
| 5,057,097 A | 10/1991 | Gesp | 604/389 |
| 5,089,321 A | 2/1992 | Chum et al. | 428/218 |
| 5,112,674 A | 5/1992 | German et al. | 428/216 |
| 5,246,783 A | 9/1993 | Spenadel et al. | 428/461 |
| 5,272,236 A | 12/1993 | Lai et al. | 526/348.5 |
| 5,272,872 A | 12/1993 | Grutter et al. | 60/274 |
| 5,322,728 A | 6/1994 | Davey et al. | 428/296 |
| 5,427,807 A | 6/1995 | Chum et al. | 426/393 |
| 5,472,775 A | 12/1995 | Obijeski et al. | 428/220 |
| 5,658,625 A | 8/1997 | Bradfute et al. | 428/34.9 |
| 5,703,187 A | 12/1997 | Timmers | 526/282 |

FOREIGN PATENT DOCUMENTS

| | | |
|---|---|---|
| EP | 0 416 815 B1 | 8/1997 |
| WO | WO 98/09999 A3 | 3/1998 |
| WO | WO 98/09999 A2 | 3/1998 |
| WO | WO 99/31176 | 6/1999 |

OTHER PUBLICATIONS

Randall, "Polymer Sequence Determination, Carbon–13 NMR Method," Academic Press, New York, 1977, pp. 71–78.

Randall, "A Review of High Resolution Liquid Carbon–13 Nuclear Magnetic Resonance Characterizations of Ethylene-Based Polymers.", Rev. Macromol. Chem. Phys., C29 (2&3), p. 201–455, (1989).

Wild, et al., "Determination of Branching Distributions in Polyethylene and ethylene Copolymers." Journal of Polymer Science, Poly Phys. Ed., vol. 20 p. 441–455 (1982).

*Primary Examiner*—Paul Thibodeau
*Assistant Examiner*—D. Lawrence Tarazano

(57) ABSTRACT

The present invention pertains to elastic films having at least one layer comprising a substantially random interpolymer or a blend thereof. The interpolymer comprises polymer units derived from at least $C_{2-20}$ α-olefin and (i) at least one vinyl aromatic monomer, or (ii) at least one aliphatic or cycloaliphatic vinyl or vinylidene monomer, or (iii) a combination of at least one aromatic vinyl monomer and at least one aliphatic or cycloaliphatic vinyl or vinylidene monomer. The interpolymer may also comprise one or more ethylenically unsaturated polymerizable monomers other than those previously mentioned. The elastic films have a recovery in the cross direction of greater than or equal to about 80% and has a recovery in the machine direction of greater than or equal to about 60%.

21 Claims, No Drawings

ELASTIC FILMS MADE FROM ALPHA-OLEFIN/VINYL AROMATIC AND/OR ALIPHATIC OR CYCLOALIPHATIC VINYL OR VINYLIDENE INTERPOLYMERS

CROSS-REFERENCE TO RELATED APPLICATIONS

This application claims the benefit of U.S. Provisional Application No. 60/088,974 filed on Jun. 11, 1998.

STATEMENT REGARDING FEDERALLY SPONSORED RESEARCH OR DEVELOPMENT

Not Applicable

FIELD OF THE INVENTION

This invention pertains to elastic films prepared from polymers which comprise at least one substantially random interpolymer comprising polymer units derived from one or more α-olefin monomers with specific amounts of one or more vinyl aromatic monomers and/or aliphatic or cycloaliphatic vinyl or vinylidene monomers, or blend compositions therefrom with other polymers. Films prepared from such interpolymers exhibit a unique balance of properties including, good elasticity as measured by high strain recovery ($\geq 80\%$ Recovery in CD and $\geq 60\%$ Recovery in MD).

The invention covers films, sheets, and multi-layer laminates. The films according to the invention may be obtained also as co-extruded and multi-layer films, such as one side sealable films, two sides sealable films, coated films, tinted films, cavitated films, untreated films, one side treated films, two sides treated films, and metallized plastic films. The inventive films can also be laminated to polyester films, styrenic polymer films, polyethylene films, non-woven fabrics, fibers, foams, and conventional oriented polypropylene films, and others to impart elastic properties to such multilayer composite structures.

BACKGROUND OF THE INVENTION

Materials with excellent stretchability and elasticity are needed to manufacture a variety of disposable and durable articles, such as tapes, bandages, incontinence garments, disposable diapers, disposable and protective clothing and fabrics. Stretchability and elasticity are desirable characteristics to effectuate a closely conforming fit to the body of the wearer or to the frame of the item. It is also desirable to maintain the conforming fit during repeated use, extensions and retractions. For incontinence articles, stretchability and elasticity are particularly desirable to insure comfort and provide security against unwanted leaks. Elastic films may also be of value for food wraps, meat wraps and household wraps where recovery is of value.

Disposable articles are typically prepared by the combination of polymer fibers, films, sheets and absorbent materials. Whereas the fibers are prepared by well known processes such as spunbonding, melt blown and continuous filament wounding, the film and sheet forming processes typically involve known extrusion and coextrusion processes, e.g., blown bubble extrusion, extrusion casting, profile extrusion, injection molding, extrusion coating and extrusion sheet. The resultant elastic film, coating or sheet may be subsequently cut or slit to short lengths and/or narrow widths to prepare strips, tapes, bands, ribbons or the like.

There are at least two ways elastic films are employed to manufacture disposable and durable articles. Elastic films, strips and sheets are used as uncombined elastic components (panels or portions), or they are constructed as or into multilayer structures to provide elastic composite materials with enhanced elasticity and stretchability. In a diaper, for example, experimental and commercial uses include in or as side panels, waist bands, backsheets, leg bands, and even topsheets where the elastic material is rendered pervious or "breathable" by such methods as apperturing, slitting, or microperforating as suggested by Lippert et al. in U.S. Pat. No. 4,861,652 (the disclosure of which is incorporated herein by reference).

An example of the use of elastic films to construct elastic composite materials is provided by Van Gompel et al. in U.S. Pat. No. 4,940,464, U.S. Pat. No. 4,938,757 and U.S. Pat. No. 4,938,753 (the disclosures of all of which are incorporated herein by reference). Van Gompel et at. disclose disposable incontinence garments containing elastic gathering means and stretchable side panels. The gathering means and stretchable side panels are made from film of block or graft copolymers such as butadiene, isoprene, styrene, ethylene-methyl acrylate, ethylene-vinyl acetate, ethylene-ethyl acrylate or blends thereof.

An example of use of elastic films to construct composites with the particular benefit of enhanced stretchability is a stretchable fastening tape for a disposable diaper disclosed by Gesp in U.S. Pat. No. 5,057,097, the disclosure of which is incorporated herein by reference.

There has been a persistent need for extrudable materials suitable for producing films, strips, sheets and composites with excellent stretchability and elasticity. Although there are a variety of elastic films currently available, these known solutions require blending or additive incorporation to meet desire levels of extrusion processability, stretchability or elasticity. Still other proposed solutions such as the method disclosed by Butin in U.S. Pat. No. 3,849,241, the disclosure of which is incorporated herein by reference, require "controlled thermal and oxidative degradation" of the elastic material to affect viscosity adjustments prior to extrusion. Moreover, prior art elastic films can involve elastomers such as styrene butadiene copolymers, polyether block amides, polyether esters and polyurethanes which typically necessitate blending with polyolefins for adequate extrusion processability.

Where polyolefins themselves have been previously employed as elastic films, other problems have arisen. For example, ethylene/α,β-unsaturated copolymers are known to possess improved elasticity as a function of increased comonomer levels. Daponte in U.S. Pat. No. 4,803,117, the disclosure of which is incorporated herein by reference, discloses ethylene vinyl ester copolymers where high vinyl ester levels are requisite to effectuate adequate elasticity for disposable articles. However, these high vinyl ester levels invariably render the polymer susceptible to undue thermal degradation.

In the modern distribution and marketing of food products, a multitude of different packaging materials are used. One principal category of food packaging materials is plastic film. Many different kinds of plastic film exist, both in composition and structure, and some are tailored to specific applications while others are more generic in nature.

Currently, polyvinyl chloride (PVC) film is the predominate plastic film used to wrap retail-cut red meat and similar products, e.g. fresh fish, poultry, vegetables, fruits, etc., due to its many desirable properties and its low cost relative to other plastic films. Representative of these desirable properties are clarity, oxygen transmission, flexibility, toughness, heat sealability, elastic recovery, and processability. However, most PVC films include a plasticizer to obtain the desired flexibility, and a growing concern exists as to the carcinogenic properties of the most commonly used PVC film plasticizer and the tendency of this plasticizer to migrate from the film to the food product. A growing concern also exists regarding the use in food wrapping applications of any plastic film comprising one or more chlorinated polymers. The concern includes the tendency for chlorinated polymers to yield corrosive acid when thermally degraded or incinerated, as well as concern regarding the general difficulty involved in recycling chlorinated polymers.

In the search for alternatives to PVC film, various monolayer olefin films, particularly polyethylene films, have been considered but none have been found to be without at least one major flaw that has blocked its utility. High density polyethylene (HDPE) is much too inelastic to be useful as a commercial wrap, while the various low density polyethylenes, e.g. low density polyethylene (LDPE), linear low density polyethylene (LLDPE), ultra low density polyethylene (ULDPE), etc., do not possess sufficient elastic recovery, and the film retains impressions or dents caused by handling of the packaged goods by potential purchasers while inspecting its contents.

Various multilayer films have also been considered (e.g. those taught in U.S. Pat. No. 5,112,674 and in EPO 0 243 965, EPO 0 333 508, and EPO 0 404 969), and significant among these are films made by co-extrusion of polyethylene with an ethylene/$\alpha,\beta$-ethylenically unsaturated carbonyl copolymer, such as ethylene vinyl acetate (EVA) or ethylene acrylic acid (EAA). These ethylene/$\alpha,\beta$-ethylenically unsaturated carbonyl copolymers are considered difficult to fabricate, have a tendency to impart an offensive taste and/or odor to the food product, and are known to interfere with anti-fogging agents.

Obijeski et al., in U.S. Pat. No. 5,472,775 disclose elastic films, particularly films, strips, coatings, ribbons and sheets made from at least one substantially linear ethylene polymer are disclosed which can be fabricated on conventional polyolefin extrusion equipment. They can be used to produce elastic composite structures that are stretchable and have recycle compatibility between elastic and non-elastic components.

Churn et al., in U.S. Pat. No. 5,427,807 disclose food packaging comprising a film having at least one film layer comprising a substantially linear ethylene polymer, preferably a polymer comprising ethylene and at least one $\alpha$-olefin comonomer, e.g. 1-octene. The film structures can be either mono- or multi-layered, oriented or non-oriented, oxygen permeable or impermeable, filled with certain inorganic fillers, and prepared by any conventional technique.

Bradfute et al., in U.S. Pat. No. 5,658,625 disclose film and sheet materials, and articles made therefrom, such as bags, pouches, trays, etc., comprising one or more layers of a thermoplastic, homogeneous alpha-olefin/vinyl aromatic copolymer, preferably an ethylene/styrene copolymer but does not indicate the optimum amounts of ethylene/vinyl and $\alpha$-olefin monomers in the ethylene/vinyl aromatic interpolymer blend component.

Thus there remains a requirement for elastic film which, as well as exhibiting the required degree of elasticity, also; a) exhibits an excellent balance in other mechanical properties such as tensile strength and elongation as well as softness and flexibility indicated by low modulus values; b) has good processability without the requirement of blending or additive incorporation such as processing aids; c) is not susceptible to undue thermal degradation; d) does not require a plasticizer to improve softness; e) does not contain corrosive chloride residues; f) does not impart an offensive taste and/or odor to foodstuffs; and; g) does not interfere with known antifogging agents.

We have now found that elastic films can be prepared having the desired elasticity, processability and mechanical properties, if such films comprise at least one substantially random interpolymer and if the amount of the vinyl aromatic and/or aliphatic or cycloaliphatic vinyl or vinylidene monomer incorporated into the substantially random interpolymer is within a specific range which results in said elastic film having a recovery in the cross direction of greater than or equal to about 80% and a recovery in the machine direction of greater than or equal to about 60%.

BRIEF SUMMARY OF THE INVENTION

The present invention pertains to elastic films having at least one layer comprising;
(A) at least one substantially random interpolymer, which comprises;
(1) polymer units derived from;
(i) at least one vinyl aromatic monomer, or
(ii) at least one aliphatic or cycloaliphatic vinyl or vinylidene monomer, or
(iii) a combination of at least one aromatic vinyl monomer and at least one aliphatic or cycloaliphatic vinyl or vinylidene monomer, and
(2) polymer units derived from at least one $C_{2-20}$ $\alpha$-olefin; and optionally
(3) polymer units derived from one or more ethylenically unsaturated polymerizable monomers other than those of (1) and (2); or
(B) a blend of Component A with at least one polymer other than that of Component A; and
wherein said elastic film has a recovery in the cross direction of greater than or equal to about 80% and has a recovery in the machine direction of greater than or equal to about 60%.

The present invention also pertains to a multilayer film comprising at least two layers wherein at least one of said layers has a recovery in the cross direction of greater than or equal to about 80% and has a recovery in the machine direction of greater than or equal to about 60% and comprises a polymer composition which comprises;
(A) at least one substantially random interpolymer, which comprises;
(1) polymer units derived from;
(i) at least one vinyl aromatic monomer, or
(ii) at least one aliphatic or cycloaliphatic vinyl or vinylidene monomer, or
(iii) a combination of at least one aromatic vinyl monomer and at least one aliphatic or cycloaliphatic vinyl or vinylidene monomer, and
(2) polymer units derived from at least one $C_{2-20}$ $\alpha$-olefin; and optionally,
(3) polymer units derived from one or more ethylenically unsaturated polymerizable monomers other than those of (1) and (2); or
(B) at least one polymer other than that of Component A.

The elastic films can be used in applications including, but not limited to, dispoasable diapers, fabrics, medical bandages, tapes, food wrap films, household wraps, stretch packaging films, labels, bands and the like.

DETAILED DESCRIPTION OF THE INVENTION

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "copolymer" as employed herein means a polymer wherein at least two different monomers are polymerized to form the copolymer.

The term "interpolymer" is used herein to indicate a polymer wherein at least two different monomers are polymerized to make the interpolymer. This includes copolymers, terpolymers, etc.

As used herein, the phrase "outer layer" refers to any film layer of a multilayer film having only one of its principal surfaces directly adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "cross direction", herein abbreviated "CD", refers to a direction across the film, perpendicular to the machine or longitudinal direction.

Elasticity can be described by the "permanent set" of the film. Permanent set is the converse of elasticity. A film is stretched to a certain point and subsequently released to the original position, and then stretched again. The point at which the elastic material begins to exert a force (i.e. show a non-zero force reading) is designated as the percent permanent set.

The term "stretchable" is used herein in reference any material which, upon application of a biasing force, elongates at least about 60 percent (i.e., to a stretched, biased length which is at least about 160 percent of its relaxed unbiased length), and which, will recover at least 55 percent of its elongation upon release of the stretching, elongating force.

As used herein, the terms "recover" and "recovery" refer to a contraction of a stretched material upon termination of a biasing force following stretching of the material by application of the biasing force. Thus a sample is pulled on a tensile testing machine with a 50 mm gauge length setting at 250 mm/min to 100% of its original length. The sample is then held at that elongation for 30 seconds. The sample is then unloaded at the same speed to the original 50 mm gauge length. After a 60 second hold, sample is pulled again to determine the point at which it exerts a force again. The % recovery: (average of five measurements) is obtained initially measuring the % elongation or percent set. This is obtained by measuring the distance to where the second load cycle begins to show a non-zero force reading. This distance is the percent set or % elongation where;

$$\% \text{ elongation} = (\text{elongated length} - \text{original length})/\text{original length} \times 100/1.$$

The % recovery is then calculated as;

$$\% \text{ recovery} = (100 - \% \text{ elongation}).$$

The term "good elasticity" as used herein is used to describe films having $\geq 80\%$ recovery in the CD and $\geq 60\%$ recovery in the MD.

As used herein, the term "nonelastic" refers to any material which does not fall within the definition of "elastic" or "stretchable" above.

As used herein, the term "less-elastic" includes "nonelastic" and any material referenced apposite an "elastic material".

The term "elastic material" as used herein refers to the films, strips, coatings, tapes, webs, ribbons, bands, sheets and the like as well as the "elastic composite materials" disclosed herein unless specifically distinguished as pertaining to the prior art.

The term "article" as used herein refers to fabricated composite items comprising elastic films disclosed herein. Articles include disposable infant care and adult incontinence care items such as incontinence garments, training pants and diapers. The term also includes packages or films used for packaging,or wrapping goods such as meat, vegetables and commercial goods. Also included are combinations of trays, bowls or other containers covered sealed or protected by such elastic films.

The term "structure" as used herein is defined as a polymer composition which has undergone a molding, film-, fiber-, or foam-forming process.

The term "fabricated article" as used herein is defined as a polymer composition in the form of a finished article which may be formed directly from said polymer composition or be formed from an intermediate comprising one of the films described herein.

The term "film" as used herein is defined as having a thickness less than or equal to about 12 mils.

The term "sheet" as used herein is defined as having a thickness greater than about 12 mils.

The term "substantially random" (in the substantially random interpolymer comprising polymer units derived from one or more α-olefin monomers with one or more vinyl aromatic monomers and/or aliphatic or cycloaliphatic vinyl or vinylidene monomers) as used herein means that the distribution of the monomers of said interpolymer can be described by the Bernoulli statistical model or by a first or second order Markovian statistical model, as described by J. C. Randall in *POLYMER SEQUENCE DETERMINATION*, Carbon-13 NMR Method, Academic Press New York, 1977, pp. 71–78. Preferably, substantially random interpolymers do not contain more than 15 percent of the total amount of vinyl aromatic monomer in blocks of vinyl aromatic monomer of snore than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain nethylene and methine carbons representing either meso diad sequences or racemic diad sequences should not exceed 75 percent of the total peak area of the main chain methylene and methine carbons.

The present invention provides elastic films prepared from at least one substantially random interpolymer comprising polymer units derived from one or more α-olefin monomers with specific amounts of one or more vinyl aromatic monomers and/or aliphatic or cycloaliphatic vinyl or vinylidene monomers. The present invention also provides elastic films prepared from blends of the substantially random α-olefin/vinylidene interpolymers with one or more other polymer components which span a wide range of compositions. The other polymer component of the blend can include, but is not limited to, one or more of an engineering thermoplastic, an α-olefin homopolymer or interpolymer, a thermoplastic olefin, a styrenic block copolymer, a styrenic homo- or copolymer, an elastomer, a thermoset polymer, or a vinyl halide polymer.

The Substantially Random Interpolymers

The interpolymers used to prepare the elastic films of the present invention include interpolymers prepared by polymerizing one or more α-olefins with one or more vinyl aromatic monomers and/or one or more aliphatic or cycloaliphatic vinyl or include interpolymers prepared by polymerizing one or more α-olefins with one or more vinyl aromatic monomers and/or one or more aliphatic or cycloaliphatic vinyl or Suitable α-olefins include for example, α-olefins containing from 2 to about 20, preferably from 2 to about 12, more preferably from 2 to about 8 carbon atoms. Particularly suitable are ethylene, propylene, butene-1, 4-methyl-1-pentene, hexene-1 or octene-1 or ethylene in combination with one or more of propylene, butene-1, 4-methyl-1-pentene, hexene-1 or octene-1. These α-olefins do not contain an aromatic moiety.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinyl aromatic monomers which can be employed to prepare the interpolymers include, for example, those represented by the following formula:

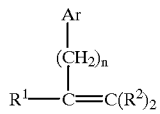

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary monovinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred aromatic monovinyl monomer is styrene.

By the term "aliphatic or cycloaliphatic vinyl or vinylidene compounds", it is meant addition polymerizable vinyl or vinylidene monomers corresponding to the formula:

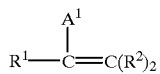

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. Preferred aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene compounds are the various isomeric vinyl- ring substituted derivatives of cyclohexene and substituted cyclohexenes, and 5-ethylidene-2-norbornene. Especially suitable are 1-, 3-, and 4-vinylcyclohexene.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

Although not a requirement for elastic behavior, the substantially random interpolymers or the elastic films comprising at least one layer of said substantially random interpolymers, may also be modified by various chain extending or crosslinking processes including, but not limited to peroxide-, silane-, sulfur-, radiation-, or azide-based cure systems. A full description of the various cross-linking technologies is described in copending U.S. patent application Ser. No's. 08/921,641 and 08/921,642 both filed on Aug. 27, 1997, the entire contents of both of which are herein incorporated by reference.

Dual cure systems, which use a combination of heat, moisture cure, and radiation steps, may be effectively employed. Dual cure systems are disclosed and claimed in U.S. patent application Ser. No. 536,022, filed on Sep. 29, 1995, in the names of K. L. Walton and S. V. Karande, incorporated herein by reference. For instance, it may be desirable to employ peroxide crosslinking agents in conjunction with silane crosslinking agents, peroxide crosslinking agents in conjunction with radiation, sulfur-containing crosslinking agents in conjunction with silane crosslinking agents, etc.

The substantially random interpolymers may also be modified by various other cross-linking processes including, but not limited to the incorporation of a diene component as a termonomer in its preparation and subsequent cross linking by the aforementioned methods and further methods including vulcanization via the vinyl group using sulfur for example as the cross linking agent.

The substantially random interpolymers can be prepared as described in EP-A-0,416,815 by James C. Stevens et al. and U.S. Pat. No. 5,703,187 by Francis J. Timmers, both of which are incorporated herein by reference in their entirety. Such a method of preparation of the substantially random interpolymers includes polymerizing a mixture of polymerizable monomers in the presence of one or more metallocene or constrained geometry catalysts in combination with various cocatalysts. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475, filed May 20, 1991 (EP-A-514,828); as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl aromatic interpolymers can also be prepared by the methods described in JP 07/278230 employing compounds shown by the general formula

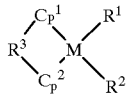

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,809 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift range 43.70–44.25 ppm and 38.01–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/ vinyl aromatic monomer/ethylene tetrad will give rise to similar carbon-13 NMR peaks but with slightly different chemical shifts.

These interpolymers can be prepared by conducting the polymerization at temperatures of about −30° C. to about 250° C. in the presence of such catalyst as those represented by the formula

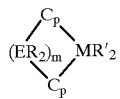

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each $R_1'$ is independently, each occurrence, H, halo, hydrocarbyl, hyrocarbyloxy, silahydrocarbyl, hydrocarbylsilyl containing up to about 30 preferably from 1 to about 20 more preferably from 1 to about 10 carbon or silicon atoms or two $R^{1'}$ groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

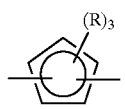

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently, each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl))zirconium dichloride, racemic-(dimethylsilanediyl)-bis-(2-methyl-4-phenylindenyl)) zirconium 1,4-diphenyl-1,3-butadiene, racemic-(dimethylsilanediyl)-bis-(2-methyl-4-phenylindenyl)) zirconium di-C1–4 alkyl, racemic-(dimethylsilanediyl)-bis-(2-methyl-4-phenylindenyl)) zirconium di-C1–4 alkoxide, or any combination thereof and the like.

It is also possible to use the following titanium-based constrained geometry catalysts, [N-(1,1-dimethylethyl)-1,1-dimethyl-1-[(1,2,3,4,5-$\eta$)-1,5,6,7-tetrahydro-s-indacen-1-yl]silanaminato(2-)-N]titanium dimethyl; (1-indenyl)(tert-butylamido) dimethyl-silane titanium dimethyl; ((3-tert-butyl)(1,2,3,4,5-$\eta$)-1-indenyl)(tert-butylamido) dimethylsilane titanium dimethyl; and ((3-iso-propyl)(1,2,3,4,5-$\eta$)-1-indenyl)(tert-butyl amido)dimethylsilane titanium dimethyl, or any combination thereof and the like.

Further preparative methods for the interpolymers used in the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a $MgCl_2/TiCl_4/NdCl_3/Al$ $(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pp. 1071–1083, 1997) have described the influence of polymerization conditions on the copolymerization of styrene with ethylene using $Me_2Si$ $(Me_4Cp)(N\text{-tert-butyl})TiCl_2/$methylaluminoxane Ziegler-Natta catalysts. Copolymers of ethylene and styrene produced by bridged metallocene catalysts have been described by Arai, Toshiaki and Suzuki (*Polymer Preprints, Am. Chem. Soc., Div. Polym. Chem.*) Volume 38, pages 349, 350 [1997]) and in U.S. Pat. No. 5,652,315, issued to Mitsui Toatsu Chemicals, Inc. The manufacture of $\alpha$-olefin/vinyl aromatic monomer interpolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Industries Ltd or as disclosed in DE 197 11 339 A1 to Denki KAGAKU KOGYO KK. All the above methods disclosed for preparing the interpolymer component are incorporated herein by reference.

While preparing the substantially random interpolymer, an amount of atactic vinyl aromatic homopolymer may be formed due to homopolymerization of the vinyl aromatic monomer al elevated temperatures. The presence of vinyl aromatic homopolymer is in general not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 30 weight percent, preferably less than 20 weight percent based on the total weight of the interpolymers of atactic vinyl aromatic homopolymer is present.

Blend Compositions Comprising the Substantially Random Interpolymers

The present invention also provides films prepared from blends of the substantially random $\alpha$-olefin/vinyl or vinylidene interpolymers with one or more other polymer components which span a wide range of compositions.

The other polymer component of the blend can include, but is not limited to, one or more of an engineering thermoplastic, an $\alpha$-olefin homopolymer or interpolymer, a thermoplastic olefin, a styrenic block copolymer, a styrenic copolymer, an elastomer, a thermoset polymer, or a vinyl halide polymer.

Engineering Thermoplastics

The third edition of the Kirk-Othmer Encyclopedia of Science and Technology (Volume 9, p 118–137, herein incorporated by reference), defines engineering plastics as thermoplastic resins, neat or unreinforced or filled, which maintain dimensional stability and most mechanical properties above 100° C. and below 0° C. The terms "engineering plastics" and "engineering thermoplastics", can be used interchangeably. Engineering thermoplastics include acetal and acrylic resins, polyamides (e.g. nylon-6, nylon 6,6,), polyimides, polyetherimides, cellulosics, polyesters, poly (arylate), aromatic polyesters, poly(carbonate), poly (butylene) and polybutylene and polyethylene terephthalates, liquid crystal polymers, and selected polyolefins, blends, or alloys of the foregoing resins, and some examples from other resin types (including e.g. polyethers) high temperature polyolefins such as polycyclopentanes, its copolymers, and polymethylpentane.).

An especially preferred engineering thermoplastic are the acrylic resins which derive from the peroxide-catalyzed free radical polymerization of methyl methacrylate (MMA). As described by H. Luke in Modern Plastics Encyclopedia, 1989, pps 20–21, MMA is usually copolymerized with other acrylates such as methyl- or ethyl acrylate using four basic polymerization processes, bulk, suspension, emulsion and solution. Acrylics can also be modified with various ingredients including butadiene, vinyl and butyl acrylate.

The ($\alpha$-Olefin Homopolymers and Interpolymers

The $\alpha$-olefin homopolymers and interpolymers comprise polypropylene, propylene/$C_4$–$C_{20}$ $\alpha$-olefin copolymers, polyethylene, and ethylene/$C_3$–$C_{20}$ $\alpha$-olefin copolymers, the interpolymers can be either heterogeneous ethylene/$\alpha$-olefin interpolymers or homogeneous ethylene/$\alpha$-olefin interpolymers, including the substantially linear ethylene/$\alpha$-olefin interpolymers. Also included are aliphatic $\alpha$-olefins having from 2 to 20 carbon atoms and containing polar groups. Suitable aliphatic $\alpha$-olefin monomers which introduce polar groups into the polymer include, for example, ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acryl ate or methacrylate, 2-ethyl-hexylacrylate, or ethylene-vinyl acetate copolymers etc.; ethylenically unsaturated dicarboxylic acid imides such as N-alkyl or N-aryl maleimides such as N-phenyl maleimide, etc. Preferably such monomers containing polar groups are acrylic acid, vinyl acetate, maleic anhydride and acrylonitrile. Halogen groups which can be included in the polymers from aliphatic α-olefin monomers include fluorine, chlorine and bromine; preferably such polymers are chlorinated polyethylenes (CPEs)

Heterogeneous interpolymers are differentiated from the homogeneous interpolymers in that in the latter, substantially all of the interpolymer molecules have the same ethylene/comonomer ratio within that interpolymer, whereas heterogeneous interpolymers are those in which the interpolymer molecules do not have the same ethylene/comonomer ratio. The term "broad composition distribution" used herein describes the comonomer distribution for heterogeneous interpolymers and means that the heterogeneous interpolymers have a "linear" fraction and that the heterogeneous interpolymers have multiple melting peaks (i.e., exhibit at least two distinct melting peaks) by DSC. The heterogeneous interpolymers have a degree of branching less than or equal to 2 methyls/1000 carbons in about 10 percent (by weight) or more, preferably more than about 15 percent (by weight), and especially more than about 20 percent (by weight). The heterogeneous interpolymers also have a degree of branching equal to or greater than 25 methyls/1000 carbons in about 25 percent or less (by weight), preferably less than about 15percent (by weight), and especially less than about 10 percent (by weight).

The Ziegler catalysts suitable for the preparation of the heterogeneous component of the current invention are typical supported, Ziegler-type catalysts. Examples of such compositions are those derived from organomagnesium compounds, alkyl halides or aluminum halides or hydrogen chloride, and a transition metal compound. Examples of such catalysts are described in U.S. Pat No. 4,314,912 (Lowery, Jr. et al.), U.S. Pat. No. 4,547,475 (Glass et al.), and U.S. Pat. No. 4,612,300 (Coleman, III), the teachings of which are incorporated herein by reference.

Suitable catalyst materials may also be derived from a inert oxide supports and transition metal compounds. Examples of such compositions are described in U.S. Pat. No. 5,420,090 (Spencer. et al.), the teachings of which are incorporated herein by reference.

The heterogeneous polymer component can be an α-olefin homopolymer preferably polyethylene or polypropylene, or, preferably, an interpolymer of ethylene with at least one $C_3$–$C_{20}$ α-olefin and/or $C_4$–$C_{18}$ dienes. Heterogeneous copolymers of ethylene, and propylene, 1-butene, 1-hexene, 4-methyl-1-pentene and 1-octene are especially preferred.

The relatively recent introduction of metallocene-based catalysts for ethylene/α-olefin polymerization has resulted in the production of new ethylene interpolymers known as homogeneous interpolymers.

The homogeneous interpolymers useful for forming the compositions described herein have homogeneous branching distributions. That is, the polymers are those in which the comonomer is randomly distributed within a given interpolymer molecule and wherein substantially all of the interpolymer molecules have the same ethylene/comonomer ratio within that interpolymer. The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), in U.S. Pat. No. 4,798,081 (Hazlitt et al.), or as is described in U.S. Pat. No. 5,008,204 (Stehling), the disclosure of which is incorporated herein by reference. The technique for calculating CDBI is described in U.S. Pat. No. 5,322,728 (Davey et al. ) and in U.S. Pat. No. 5,246,783 (Spenadel et al.). or in U.S. Pat. No. 5,089,321 (Chum et al.) the disclosures of all of which are incorporated herein by reference. The SCBDI or CDBI for the homogeneous interpolymers used in the present invention is preferably greater than about 30 percent, especially greater than about 50 percent.

The homogeneous interpolymers used in this invention essentially lack a measurable "high density" fraction as measured by the TREF technique (i.e., the homogeneous ethylene/α-olefin interpolymers do not contain a polymer fraction with a degree of branching less than or equal to 2 methyls/1000 carbons). The homogeneous interpolymers also do not contain any highly short chain branched fraction (i.e., they do not contain a polymer fraction with a degree of branching equal to or more than 30 methyls/1000 carbons).

The substantially linear ethylene/α-olefin polymers and interpolymers of the present invention are also homogeneous interpolymers but are further herein defined as in U.S. Pat. No. 5,272,236 (Lai et al.), and in U.S. Pat. No. 5,272,872, the entire contents of which are incorporated by reference. Such polymers are unique however due to their excellent processability and unique Theological properties and high melt elasticity and resistance to melt fracture. These polymers can be successfully prepared in a continuous polymerization process using the constrained geometry metallocene catalyst systems.

The term "substantially linear" ethylene/α-olefin interpolymer means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least one carbon more than two carbons less than the total number of carbons in the comonomer, for example, the long chain branch of an ethylene/octene substantially linear ethylene interpolymer is at least seven (7) carbons in length (i.e., 8 carbons less 2 equals 6 carbons plus one equals seven carbons long chain branch length). The long chain branch can be as long as about the same length as the length of the polymer back-bone. Long chain branching is determined by using $^{13}C$ nuclear magnetic resonance (NMR) spectroscopy and is quantified using the method of Randall (*Rev. Macro-*

*mol. Chem. Phys.*, C29 (2&3), p. 285–297), the disclosure of which is incorporated herein by reference. Long chain branching, of course, is to be distinguished from short chain branches which result solely from incorporation of the comonomer, so for example the short chain branch of an ethylene/octene substantially linear polymer is six carbons in length, while the long chain branch for that same polymer is at least seven carbons in length.

The catalysts used to prepare the homogeneous interpolymers for use as blend components in the present invention are metallocene catalysts. These metallocene catalysts include the bis(cyclopentadienyl)-catalyst systems and the mono(cyclopentadienyl) Constrained Geometry catalyst systems (used to prepare the substantially linear ethylene/α-olefin polymers). Such constrained geometry metal complexes and methods for their preparation are disclosed in U.S. application Ser. No. 545,403, filed Jul. 3, 1990 (EP-A-416,815); U.S. application Ser. No. 547,718, filed Jul. 3, 1990 (EP-A468,651); U.S. application Ser. No. 702,475, filed May 20, 1991 (EP-A-514,828); as well as U.S. Pat. No. 5,055,438, U.S. Pat. No. 5,057,475, U.S. Pat. No. 5,096,867, U.S. Pat. No. 5,064,802, U.S. Pat. No. 5,132,380, U.S. Pat. No. 5,721,185, U.S. Pat. No. 5,374,696 and U.S. Pat. No. 5,470,993. For the teachings contained therein, the aforementioned pending United States Patent applications, issued United States Patents and published European Patent Applications are herein incorporated in their entirety by reference thereto.

In EP-A 418,044, published Mar. 20, 1991 (equivalent to U.S. Ser. No. 07/758,654) and in U.S. Ser. No. 07/758,660 certain cationic derivatives of the foregoing constrained geometry catalysts that are highly useful as olefin polymerization catalysts are disclosed and claimed. In U.S. Ser. No. 720,041, filed Jun. 24, 1991, certain reaction products of the foregoing constrained geometry catalysts with various homes are disclosed and a method for their preparation taught and claimed. In U.S. Pat. No. 5,453,410 combinations of cationic constrained geometry catalysts with an alumoxane were disclosed as suitable olefin polymerization catalysts. For the teachings contained therein, the aforementioned pending United States Patent applications, issued United States Patents and published European Patent Applications are herein incorporated in their entirety by reference thereto.

The homogeneous polymer component can be an α-olefin homopolymer preferably polyethylene or polypropylene, or, preferably, an interpolymer of ethylene with at least one $C_3$–$C_{20}$ α-olefin and/or $C_4$–$C_{18}$ dienes. Homogeneous copolymers of ethylene, and propylene, 1-butene, 1-hexene, 4-methyl-1-pentene and 1-octene are especially preferred.

Thermoplastic Olefins

Thermoplastic olefins (TPOs) are generally produced from propylene homo- or copolymers, or blends of an elastomeric material such as ethylene/propylene rubber (EPM) or ethylene/propylene dime monomer terpolymer (EPDM) and a more rigid material such as isotactic polypropylene. Other materials or components can be added into the formulation depending upon the application, including oil, fillers, and cross-linking agents. Generally, TPOs are characterized by a balance of stiffness (modulus) and low temperature impact, good chemical resistance and broad use temperatures. Because of features such as these, TPOs are used in many applications, including automotive facia and instrument panels, and also potentially in wire and cable.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5–7% ethylene copolymerized with the propylene), however, can also be used in the TPO formulations disclosed herein. In-reactor TPO's can also be used as blend components of the present invention. A complete discussion of various polypropylene polymers is contained in *Modern Plastics Encyclopedia*/89, mid October 1988 Issue, Volume 65, Number 11, pp. 86–92, the entire disclosure of which is incorporated herein by reference. The molecular weight of the polypropylene for use in the present invention is conveniently indicated using a melt flow measurement according to ASTM D-1238, Condition 230° C./2.16 kg (formerly known as "Condition (L)" and also known as I2). Melt flow rate is inversely proportional to the molecular weight of the polymer. Thus, the higher the molecular weight, the lower the melt flow rate, although the relationship is not linear. The melt flow rate for the polypropylene useful herein is generally from about 0.1 grams/10 minutes (g/10 min) to about 35 g/10 min, preferably from about 0.5 g/10 min to about 25 g/10 min, and especially from about 1 g/10 min to about 20 g/10 min.

Styrenic Block Copolymers

Also included are block copolymers having unsaturated rubber monomer units including, but not limited to, styrene-butadiene (SB), styrene-isoprene(SI), styrene-butadiene-styrene (SBS), styrene-isoprene-styrene (SIS), α-methylstyrene-butadiene-α-methylstyrene and α-methylstyrene-isoprene-α-methylstyrene.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and α-methylstyrene, and styrene is particularly preferred.

Block copolymers with unsaturated rubber monomer units may comprise homopolymers of butadiene or isoprene or they may comprise copolymers of one or both of these two dienes with a minor amount of styrenic monomer.

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers.

Styrenic Homo- and Copolymers

In addition to the block copolymers are the various styrene homopolymers and copolymers and rubber modified styrenics. These include polystyrene, high impact polystyrene and copolymers such as acrylonitrile-butadiene-styrene (ABS) polymers, styrene-acrylonitrile (SAN).

Elastomers

The elastomers include, but are not limited to, rubbers such as polyisoprene, polybutadiene, natural rubbers, ethylene/propylene rubbers, ethylene/propylene diene (EPDM) rubbers, styrene/butadiene rubbers, thermoplastic polyurethanes.

Thermoset Polymers

The thermoset polymers include but are not limited to, epoxies, vinyl ester resins, polyurethanes and phenolic resins.

Vinyl Halide Polymers

Vinyl halide homopolymers and copolymers are a group of resins which use as a building block the vinyl structure $CH_2=CXY$, where X is selected from the group consisting of F, Cl, Br, and I and Y is selected from the group consisting of F, Cl, Br, I and H.

The vinyl halide polymer component of the blends of the present invention include but are not limited to homopolymers and copolymers of vinyl halides with copolymerizable monomers such as α-olefins including but not limited to ethylene, propylene, vinyl esters of organic acids containing 1 to 18 carbon atoms, e.g. vinyl acetate, vinyl stearate and so forth; vinyl chloride, vinylidene chloride, symmetrical dichloroethylene; acrylonitrile, methacrylonitrile; alkyl acrylate esters in which the alkyl group contains 1 to 8 carbon atoms, e.g. methyl acrylate and butyl acrylate; the corresponding alkyl methacrylate esters; dialkyl esters of dibasic organic acids in which the alkyl groups contain 1–8 carbon atoms, e.g. dibutyl fumarate, diethyl maleate, and so forth.

Preferably the vinyl halide polymers are homopolymers or copolymers of vinyl chloride or vinylidene chloride. Poly (vinyl chloride) polymers (PVC) can be further classified into two main types by their degree of rigidity. These are "rigid" PVC and "flexible" PVC. Flexible PVC is distinguished from rigid PVC primarily by the presence of and amount of plasticizers in the resin. Flexible PVC typically has improved processability, lower tensile strength and higher elongation than rigid PVC.

Of the vinylidene chloride homopolymers and copolymers (PVDC), typically the copolymers with vinyl chloride, acrylates or nitriles are used commercially and are most preferred. The choice of the comonomer significantly affects the properties of the resulting polymer. Perhaps the most notable properties of the various PVDC's are their low permeability to gases and liquids, barrier properties; and chemical resistance.

Also included in the family of vinyl halide polymers for use as blend components of the present invention are the chlorinated derivatives of PVC typically prepared by post chlorination of the base resin and known as chlorinated PVC, (CPVC). Although CPVC is based on PVC and shares some of its characteristic properties, CPVC is a unique polymer having a much higher melt temperature range (410–450° C.) and a higher glass transition temperature (239–275° F.) than PVC.

The compositions comprising at least one substantially random interpolymer used to prepare the elastic films of the present invention in addition to optionally comprising one or more of another polymer components can optionally comprise one or more additives.

Other Additives

Additives such as antioxidants (e.g., hindered phenols such as, for example, Irganox® 1010, and phosphites, e.g., Irgafos™ 168, (both are registered trademarks of, and supplied by Ciba-Geigy Corporation, NY), u.v. stabilizers (including Tinuvin™ 328 and Chimassorb™ 944, both are registered trademarks of, and supplied by Ciba-Geigy Corporation, NY), cling additives (e.g., polyisobutylene), slip agents (such as erucamide and/or stearamide), antiblock additives, colorants, pigments, and the like can also be included in the interpolymers and/or blends employed to prepare the elastic films of the present invention, to the extent that they do not interfere with the elastic properties of the films comprising the substantially random interpolymers. Processing aids, which are also referred to herein as plasticizers, are optionally provided to reduce the viscosity of a composition, and include the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Suitable modifiers which can be employed herein as the plasticizer include at least one plasticizer selected from the group consisting of phthalate esters, trimellitate esters, benzoates, adipate esters, epoxy compounds, phosphate esters (triaryl, trialkyl, mixed alkyl aryl phosphates), glutarates and oils. Particularly suitable phthalate esters include, for example, dialkyl C4–C18 phthalate esters such as diethyl, dibutyl phthalate, diisobutyl phthalate, butyl 2-ethylhexyl phthalate, dioctyl phthalate, diisooctyl phthalate, dinonyl phthalate, diisononyl phthalate, didecyl phthalate, diisodecyl phthalate, diundecyl phthalate, mixed aliphatic esters such as heptyl nonyl phthalate, di(n-hexyl, n-octyl, n-decyl) phthalate (P610), di(n-octyl, n-decyl) phthalate (P810), and aromatic phthalate esters such as diphenyl phthalate ester, or mixed aliphatic-aromatic esters such as benzyl butyl phthalate or any combination thereof and the like.

Exemplary classes of oils useful as processing aids include white mineral oil (such as Kaydol™ oil (available from Witco), and Shellflex™ 371 naphthenic oil (available from Shell Oil Company). Another suitable oil is Tuflo™ oil (available from Lyondell).

Antifogging or antistatic agents can be added to the films and sheets of the present invention to increase surface conductivity and prevention of water droplet formation and attraction of dust and dirt on the film surface. These antifogging agents include, but are not limited to, glycerol mono-stearate, glycerol mono-oleate, lauric diphthalamides, ethoxylated amines, ethoxylated. esters, and other additives known in the industry.

Tackifiers can also be added to the polymer compositions used to prepare the films or sheets of the present invention in order to alter the Tg and thus extend the available application temperature window of the film. Examples of the various classes of tackifiers include, but are not limited to, aliphatic resins, polyterpene resins, hydrogenated resins, pure monomer hydrocarbon resin, styrene/α-methylene styrene resins, mixed aliphatic-aromatic resins, hydrogenated pure monomer hydrocarbon resin, modified styrene copolymers, pure aromatic monomer copolymers, and hydrogenated aliphatic hydrocarbon resins. Exemplary aliphatic resins include those available under the trade designations Escorez™, Piccotac™, Mercures™, Wingtack™, Hi-Rez™, Quintone™, Tackirol™, etc. Exemplary polyterpene resins include those available under the trade designations Nirez™, Piccolyte™, Wingtack™, Zonarez™, etc. Exemplary hydrogenated resins include those available under the trade designations Escorez™, Arkon™, Clearon™, etc. Exemplary mixed aliphatic-aromatic resins include those available under the trade designations Escorez™, Regalite™, Hercures™, AR™, Imprez™, Norsolene™, M, Marukarez™, Arkon™, M, Quintone™, Wingtack™,etc. One particularly preferred class of tackifiers includes the styrene/α-methylene stryene tackifiers available from Hercules. Particularly suitable classes of tackifiers include Wingtack™ 86 and Hercotac™ 1149, Eastman H-130, and styrene/α-methyl styrene tackifiers.

Also included as a potential component of the polymer compositions used in the present invention are various organic and inorganic fillers, the identity of which depends upon the type of application for which the elastic film is to be utilized. Representative examples of such fillers include organic and inorganic fibers such as those made from asbestos, boron, graphite, ceramic, glass, metals (such as stainless steel) or polymers (such as aramid fibers) talc, carbon black, carbon fibers, calcium carbonate, alumina trihydrate, glass fibers, marble dust, cement dust, clay feldspar, silica or glass, fumed silica, alumina, magnesium oxide, magnesium hydroxide, antimony oxide, zinc oxide, barium sulfate, aluminum silicate, calcium silicate, titanium dioxide, titanates, aluminum nitride, $B_2O_3$, nickel powder or chalk.

Other representative organic or inorganic, fiber or mineral, fillers include carbonates such as barium, calcium or magnesium carbonate; fluorides such as calcium or sodium aluminum fluoride; hydroxides such as aluminum hydroxide; metals such as aluminum, bronze, lead or zinc; oxides such as aluminum, antimony, magnesium or zinc oxide, or silicon or titanium dioxide; silicates such as asbestos, mica, clay (kaolin or calcined kaolin), calcium silicate, feldspar, glass (ground or flaked glass or hollow glass spheres or microspheres or beads, whiskers or filaments), nepheline, perlite, pyrophyllite, talc or wollastonite; sulfates such as barium or calcium sulfate; metal sulfides; cellulose, in forms such as wood or shell flour; calcium terephthalate; and liquid crystals. Mixtures of more than one such filler may be used as well.

These additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired result, to provide the desired color from the colorant or pigment. Such additives can suitably be employed in the range of from 0.05 to 50, preferably from 0.1 to 35, more preferably from 0.2 to 20 percent by weight based upon the weight of the polymer or polymer blend. When a processing aid is employed, it will be present in the composition of the invention in an amount of at least 5 percent. The processing aid will typically be present in an amount of no more than 60, preferably no more than 30, and most preferably no more than 20 weight percent.

Preparation of the Blends Comprising the Substantially Random Interpolymers

The blended polymer compositions used to prepare the elastic films of the present invention can be prepared by any convenient method, including dry blending the individual components and subsequently melt mixing or melt compounding in a Haake torque rheometer or by dry blending without melt blending followed by part fabrication, either directly in the extruder or mill used to make the finished article (e.g., the automotive part), or by pre-melt mixing in a separate extruder or mill (e.g., a Banbury mixer), or by solution blending, or by compression molding, or by calendering.

Preparation of the Elastic Films of the Present Invention

The elastic films of the present invention can be made using conventional fabrication techniques, e.g. simple bubble extrusion, simple cast/sheet extrusion, coextrusion, lamination, etc. Conventional simple bubble extrusion processes (also known as hot blown film processes) are described, for example, in *The Encyclopedia of Chemical Technology*, Kirk-Othmer, Third Edition, John Wiley & Sons, New York, 1981, Vol 16, pp. 416–417 and Vol. 18, pp. 191–92, the disclosures of which are incorporated herein by reference.

Injection molding, thermoforming, extrusion coating, profile extrusion, and sheet extrusion processes are described, for example, in Plastics Materials and Processes, Seymour S. Schwartz and Sidney H. Goodman, Van Nostrand Reinhold Company, New York, 1982, pp. 527–563, pp. 527–563, pp. 596–602. The strips, tapes and ribbons of the present invention can be prepared by the primary extrusion process itself or by known post-extrusion slitting, cutting or stamping techniques. Profile extrusion is an example of a primary extrusion process that is particularly suited to the preparation of tapes, bands, ribbons and the like.

The elastic films of the present invention can also be rendered pervious or "breathable" by any method well known in the art including by apperturing, slitting, microperforating, mixing with fibers or foams, or the like and combinations thereof. Examples of such methods include, U.S. Pat. No. 3,156,242 by Crowe, Jr., U.S. Pat. No. 3,881,489 by Hartwell, U.S. Pat. No. 3,989,867 by Sisson and U.S. Pat. No. 5,085,654 by Buell, the disclosures of all of which are incorporate herein by reference.

The film structure and the substantially random interpolymer selected for use in the practice of this invention will depend in large part upon the particulars of the application, e.g. the preferred properties of a film used in a shrink wrap are different than the preferred properties of a film used in a stretch overwrap. The present elastic film structures can be monolayer film or a multilayer film in which one or more film layers comprises at least one substantially random interpolymer.

In those embodiments in which the film structure is multilayer, it can be of any conventional structure, e.g. 2-ply, 3-ply, 4-ply, 5-ply, 6-ply, 7-ply, etc. The structure will generally have an odd number of layers, and the film layer(s) comprising a substantially random interpolymer can be one or both outer layers and/or one or more core layers. Those layer(s) constructed from polymer other than a substantially random interpolymer can comprise any suitable material generally compatible with a film constructed from a substantially random interpolymer, e.g. one or more conventional LDPE, LLDPE, ULDPE, EVA, EAA, and the like. Additives such as those described above with respect to monolayer films can also be used in these multilayer films, and these additives can be incorporated into any of the film layers as desired, e.g. tackifiers and slip agents into one or both outer layers, fillers in one or more core layers, etc.

Other multilayer film manufacturing techniques for food packaging applications are described in *Packaging, Foods With Plastics* by Wilmer A. Jenkins and James P. Harrington (1991), pp. 19–27, and in "Coextrusion Basics" by Thomas I. Butler, *Film Extrusion Manual: Process, Materials, Properties*, pp. 31–80 (published by TAPPI Press (1992)) the disclosures of which are incorporated herein by reference.

Other desirable properties of the plastic films used in this invention include, depending on the nature of the other film layers in the structure, ease of fabrication and good oxygen permeability (particularly with respect to films made from such copolymers as EVA and EAA), oxygen impermeability (particularly with respect to films containing an oxygen barrier such as SARAN or ethylene vinyl alcohol), dart impact, puncture resistance, tensile strength, low modulus, tear resistance, shrinkability, high clarity and a low affect on the taste and odor properties of the packaged food.

The plastic films of this invention are well suited for stretch overwrap packaging various fresh foods, e.g. retail-cut red meats, fish, poultry, vegetables, fruits, cheeses, and other food products destined for retail display. These films are preferably prepared as nonshrink films (e.g., without biaxial orientation induced by double bubble processing), with good stretch, elastic recovery and hot tack characteristics, and can be made available to wholesalers and retailers in any conventional form, e.g. stock rolls, and used on all conventional equipment.

Other plastic films of this invention can be used as shrink, skin and vacuum form packages for foods. The films comprising the shrink packages are typically biaxially oriented, exhibit low shrink tension, are of a density greater than about 0.89 g/cm$^3$, and are typically about 0.6 to about 2 mil in thickness. The elastic film structures used in vacuum skin packaging can be multilayered, are typically about 5 to about 12 mil in thickness.

The elastic films of the present invention can also be formed by extrusion processes and, most preferably, by art-known coextrusion methods. Following coextrusion the film is cooled to a solid state by, for example, cascading water or chilled air quenching. For some structures a precursor film layer or layers may be formed by extrusion with additional layers thereafter being extrusion coated thereon to form multilayer films. Two multilayer tubes may also be formed with one of the tubes thereafter being coated or laminated onto the other.

Preparation of the Fabricated Composite Articles Comprising, the Elastic Film of The Present Invention.

Fabricated articles which can be made using the novel elastic films disclosed herein include composite fabric articles (e.g., disposable incontinence garments and diapers) that are comprised of one or more elastic component or portion. For example, elastic components are commonly present in diaper waist band portions to prevent the diaper from falling and leg band portions to prevent leakage (as shown in U.S. Pat. No. 4,381,781 (Sciaraffa), the disclosure of which is incorporated herein by reference). Often, the elastic component promotes better form fitting and/or fastening systems for a good combination of comfort and security. The novel elastic films disclosed herein can also produce fabric composite structures which combine elasticity with breathability by utilization of a technique that renders the elastic film pervious or "breathable" such as suggested by Lippert et al. in U.S. Pat. No. 4,861,652 and indicated above.

The novel elastic films disclosed herein can also be used in various structures as described in U.S. Pat. No. 2,957,512 (Wade), the disclosure of which is incorporated herein by reference. For example, layer 50 of the structure described in U.S. Pat. No. '512 (i.e., the elastic component) can be replaced with the novel elastic film, especially where flat, pleated, creped, etc., nonelastic films are made into elastic or semi-elastic structures. Attachment of the novel elastic films to nonelastic or less-elastic films can be done with heat bonding or with adhesives. Gathered or shirred elastic composite materials can be produced from the new elastic film described herein and nonelastic components by pleating the non-elastic component (as described in U.S. Pat. No. '512) prior to attachment, prestretching the elastic component prior to attachment, or heat shrinking the elastic component after attachment.

The novel elastic films described herein can also be used to make other novel structures. For example, U.S. Pat. No. 4,801,482 (Goggans), the disclosure of which is incorporated herein by reference, discloses an elastic sheet (12) which can now be made with the novel materials described herein.

The novel elastic films described herein can also be used to make breathable portion or breathable elastic composite materials. For example, U.S. Pat. No. 5,085,654 (Buell) discloses a leg band (15) with a breathable portion 45, a breathable topsheet (26), a breathable backsheet (25), elastic elements (31 and 64), a breathable element (54), and a breathable sub-element (96) all or any combination of which can now be made with the elastic films disclosed herein in either pervious or impervious forms.

The novel elastic films disclosed herein also have adjustable stretchability and elasticity that can be achieved by specific combinations of elastic films and less-elastic material and/or by adjusting the interpolymer composition or by specific combination of different substantially random interpolymers, which enables design flexibility for variable stretchability or retractive force in the same garment, as described for example in U.S. Pat. No. 5,196,000 (Clear et al.), the disclosure of which is incorporated herein by reference.

U.S. Pat. No. 5,037,416 (Allen et al.), the disclosure of which is incorporated herein by reference, describes the advantages of a form fitting top sheet by using elastic ribbons (member 12) and an elastic backsheet (member 16). Pervious novel elastic films described herein could serve the function of member 12 and impervious elastics materials of this invention could function as member 16, or disclosed elastic films could be used in an elastic composite fabric form.

In U.S. Pat. No. 4,981,747 (Morman), the novel elastic films disclosed herein can be substituted for elastic sheets 12, 122 and 232 to construct an elastic composite material which includes a reversibly necked material.

Elastic panels, elements, portions or the like can also be made from the novel elastic films disclosed herein, and can be used, for example, as members 18, 20, 24, and/or 26 of U.S. Pat. No. 4,940,464 (Van Gompel), the disclosure of which is incorporated herein by reference. The novel elastic films described herein can also be used, for example, as elastic composite side panels (e.g., layer) or as elastic ribbons 42 and/or 44.

Properties of the Elastic Film of The Present Invention.

Where the elasticity of the novel films of the present invention varies with respect to the thickness of the material, thicknesses less than about 22 mils, preferably from about 0.1 mils to about 20 mils, and more preferably, from about 0.4 mils to about 15 mils are considered to be within the purview of this invention.

The elastic films of the present invention films have a recovery in the CD of $\geq$ about 80% preferably $\geq$ about 90%, more preferably $\geq$ about 95%, and a recovery in the MD of $\geq$ 60%, preferably $\geq$ about 70%, more preferably $\geq$ about 75%.

For the novel elastic films disclosed herein, the melt index of the substantially random interpolymer can be widely varied, with little impact on elasticity. This allows more design flexibility for elastic composites and finished articles because the strength and retractive force of the elastic film can be changed independently of its elasticity For example, the tensile strength properties of an elastic film can be changed by changing the polymer's melt index (decreasing the melt index increases the tensile strength properties), rather than by changing the thickness of the film, thus permitting a better optimization of the "hand" (i.e., feel) of an elastic composite fabric with the substantially random interpolymers disclosed herein is limited in traditional ways as requirements respecting specific extrusion processed. As examples, extrusion coating and injection molding processes typically require high melt indices to avoid excessive extrusion pressures and polymer shearing as well as to provide adequate melt flow characteristics, while blown film processes generally require lower melt indices to achieve adequate bubble stability.

Properties of the Interpolymers and Blend Compositions Used to Prepare the Elastic Films of the Present Invention The polymer compositions used to prepare the elastic films of the present invention comprise from about 50 to 100, preferably from about 75 to 100, more preferably from about 90 to about 95 wt %, (based on the combined weights of this interpolymer) of one or more interpolymers of one or more α-olefins and one or more monovinyl aromatic monomers and/or one or more aliphatic or cycloaliphatic vinyl or vinylidene monomers.

It has been discovered that elastic properties in the resultant films are observed when these substantially random interpolymers contain from about 10 to about 40 preferably from about 13 to about 33, more preferably from 15 to about 29 mole percent of at least one vinyl aromatic monomer and/or aliphatic or cycloaliphatic vinyl or vinylidene monomer and from about 60 to about 90, preferably from about 67 to about 87, more preferably from about 71 to about 85 mole percent of at least one aliphatic α-olefin having from 2 to about 20 carbon atoms.

The number average molecular weight (Mn) of the substantially random interpolymer used to prepare the elastic films of the present invention is greater than about 10,000, preferably from about 20,000 to about 500,000, more preferably from about 30,000 to about 300,000.

The melt index ($I_2$) of the substantially random interpolymer used to prepare the elastic films of the present invention is about 0.1 to about 1,000, preferably of from about 0.5 to about 200, more preferably of from about 0.5 to about 100 g/10 min.

The molecular weight distribution ($M_w/M_n$) of the substantially random interpolymer used to prepare the elastic films of the present invention is from about 1.5 to about 20, preferably of from about 1.8 to about 10, more preferably of from about 2 to about 5.

The density of the substantially random/interpolymer used to prepare the elastic films of the present invention is greater than about 0.930, preferably from about 0.930 to about 1.045, more preferably of from about 0.930 to about 1.040, most preferably of from about 0.930 to about 1.030 g/cm$^3$.

The polymer compositions used to prepare the elastic films of the present invention can also comprise from 0 to about 50, preferably from 0 to about 25, even more preferably 5 to about 10 percent of by weight of at least one polymer other than the substantially random interpolymer (based on the combined weights of this component and the substantially random interpolymer) which can comprise a homogenous α-olefin homopolymer or interpolymer comprising polypropylene, propylene/$C_4$–$C_{20}$ α-olefin copolymers, polyethylene, and ethylene/$C_3$–$C_{20}$ α-olefin copolymers, the interpolymers can be either heterogeneous ethylene/α-olefin interpolymers, preferably a heterogeneous ethylene/$C_3$–$C_8$ α-olefin interpolymer, most preferably a heterogeneous ethylene/octene-1 interpolymer or homogeneous ethylene/α-olefin interpolymers, including the substantially linear ethylene/α-olefin interpolymers, preferably a substantially linear ethylene/α-olefin interpolymer, most preferably a substantially linear ethylene/$C_3$–$C_8$ α-olefin interpolymer; or a heterogeneous ethylene/α-olefin interpolymer; or a thermoplastic olefin, preferably an ethylene/propylene rubber (EPM) or ethylene/propylene diene monomer terpolymer (EPDM) or isotactic polypropylene, most preferably isotactic polypropylene; or a styreneic block copolymer, preferably styrene-butadiene (SB), styrene-isoprene(SI), styrene-butadiene-styrene (SBS), styrene-isoprene-styrene (SIS) or styrene-ethylene/butene-styrene (SEBS) block copolymer, most preferably a styrene-butadiene-styrene (SBS) copolymer; or styrenic homopolymers or copolymers, preferably polystyrene, high impact polystyrene, polyvinyl chloride, copolymers of styrene and at least one of acrylonitrile, meth-acrylonitrile, maleic anhydride, or α-methyl styrene, most preferably polystyrene, or elastomers, preferably polyisoprene, polybutadiene, natural rubbers, ethylene/propylene rubbers, ethylene/propylene diene (EPDM) rubbers, styrene/butadiene rubbers, thermoplastic polyurethanes, most preferably thermoplastic polyurethanes; or thermoset polymers, preferably epoxies, vinyl ester resins, polyurethanes, phonolic resins, most preferably polyurethanes; or vinyl halide homopolymers and copolymers, preferably homopolymers or copolymers of vinyl chloride or vinylidene chloride or the chlorinated derivatives therefrom, most preferably poly (vinyl chloride) and poly (vinylidene chloride); or engineering thermoplastics, preferably poly(methylmethacrylate) (PMMA), cellulosics, nylons, poly(esters), poly(acetals); poly(amides),the poly(arylate), aromatic polyesters, poly (carbonate), poly(butylene) and polybutylene and polyethylene terephthalates, most preferably poly (methylmethacrylate) (PMMA), and poly(esters).

The elastic films according to the present invention may be successfully employed for packaging in general and for packaging small items in particular. Other potential applications include, but are not limited to, meat over-wrap, paper replacement, table cloths and shower curtains and the like.

The following examples are illustrative of the invention, but are not to be construed as to limiting the scope thereof in any manner.

EXAMPLES

Test Methods a) Melt Flow and Density Measurements

The molecular weight of the polymer compositions for use in the present invention is conveniently indicated using a melt index measurement according to ASTM D-1238, Condition 190° C./2.16 kg (formally known as "Condition (E)" and also known as $I_2$) was determined. Melt index is inversely proportional to the molecular weight of the polymer. Thus, the higher the molecular weight, the lower the melt index, although the relationship is not linear.

Also useful for indicating the molecular weight of the substantially random interpolymers used in the present invention is the Gottfert melt index (G, cm$^3$/10 min) which is obtained in a similar fashion as for melt index ($I_2$) using the ASTM D1238 procedure for automated plastometers, with the melt density set to 0.7632, the melt density of polyethylene at 190° C.

The relationship of melt density to styrene content for ethylene-styrene interpolymers was measured, as a function of total styrene content, at 190° C. for a range of 29.8% to 81.8% by weight styrene. Atactic polystyrene levels in these samples was typically 10% or less. The influence of the atactic polystyrene was assumed to be minimal because of the low levels. Also, the melt density of atactic polystyrene and the melt densities of the samples with high total styrene are very similar. The method used to determine the melt density employed a Gottfert melt index machine with a melt density parameter set to 0.7632, and the collection of melt strands as a function of time while the $I_2$ weight was in force.

The weight and time for each melt strand was recorded and normalized to yield the mass in grams per 10 minutes. The instrument's calculated $I_2$ melt index value was also recorded. The equation used to calculate the actual melt density is $$\delta = \delta_{0.7632} \times I_2/I_{2\ Gottfert}$$

where $\delta_{0.7632} = 0.7632$ and $I_{2\ Gottfert}$ = displayed melt index.

A linear least squares fit of calculated melt density versus total styrene content leads to an equation with a correlation coefficient of 0.91 for the following equation:

$$\delta = 0.00299 \times S + 0.723$$

where S=weight percentage of styrene in the polymer. The relationship of total styrene to melt density can be used to determine an actual melt index value, using these equations if the styrene content is known.

So for a polymer that is 73% total styrene content with a measured melt flow (the "Gottfert number"), the calculation becomes:

$$x = 0.00299 * 73 + 0.723 = 0.9412$$

where $$0.9412/0.7632 = I_2/G\# \text{ (measured)} = 1.23$$

The density of the substantially random interpolymers used in the present invention was determined in accordance with ASTM D-792.

b) Styrene Analyses

Interpolymer styrene content and atactic polystyrene concentration were determined using proton nuclear magnetic resonance ($^1$H N.M.R). All proton NMR samples were prepared in 1,1,2,2-tetrachloroethane-$d_2$ (TCE-$d_2$). The resulting solutions were 1.6–3.2 percent polymer by weight. Melt index ($I_2$) was used as a guide for determining sample concentration. Thus when the $I_2$ was greater than 2 g/10 min, 40 mg of interpolymer was used; with an $I_2$ between 1.5 and 2 g/10 min, 30 mg of interpolymer was used; and when the $I_2$ was less than 1.5 g/10 min, 20 mg of interpolymer was used. The interpolymers were weighed directly into 5 mm sample tubes. A 0.75 mL aliquot of TCE-$d_2$ was added by syringe and the tube was capped with a tight-fitting polyethylene cap. The samples were heated in a water bath at 85° C. to soften the interpolymer. To provide mixing, the capped samples were occasionally brought to reflux using a heat gun.

Proton NMR spectra were accumulated on a Varian VXR 300 with the sample probe at 80° C., and referenced to the residual protons of TCE-$d_2$ at 5.99 ppm. The delay times were varied between 1 second, and data was collected in triplicate on each sample. The following instrumental conditions were used for analysis of the interpolymer samples:

Varian VXR-300, standard $^1$H:
  Sweep Width, 5000 Hz
  Acquisition Time, 3.002 sec
  Pulse Width, 8 μsec
  Frequency, 300 MHz
  Delay, 1 sec
  Transients, 16

The total analysis time per sample was about 10 minutes.

Initially, a $^1$H NMR spectrum for a sample of the polystyrene, Styron™ 680 (available from and a registered trademark of the Dow Chemical Company, Midland, Mich.) was acquired with a delay time of one second. The protons were "labeled": b, branch; a, alpha; o, ortho; m, meta; p, para, as shown in FIG. 1.

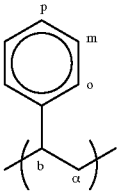

FIG.1

Integrals were measured around the protons labeled in FIG. 1; the 'A' designates aPS. Integral $A_{7.1}$ (aromatic, around 7.1 ppm) is believed to be the three ortho/para protons; and integral $A_{6.6}$ (aromatic, around 6.6 ppm) the two meta protons. The two aliphatic protons labeled α resonate at 1.5 ppm; and the single proton labeled b is at 1.9 ppm. The aliphatic region was integrated from about 0.8 to 2.5 ppm and is referred to as $A_{al}$. The theoretical ratio for $A_{7.1}:A_{6.6}:A_{al}$ is 3:2:3, or 1.5:1:1.5, and correlated very well with the observed ratios for Styron™ 680 (available from and a registered trademark of the Dow Chemical Company, Midland, Mich. for several delay times of 1 second. The ratio calculations used to check the integration and verify peak assignments were performed by dividing the appropriate integral by the integral $A_{6.6}$ Ratio $A_r$ is $A_{7.1}/A_{6.6}$.

Region $A_{6.6}$ was assigned the value of 1. Ratio Al is integral $A_{al}/A_{6.6}$. All spectra collected have the expected 1.5:1:1.5 integration ratio of (o+p):m:(α+b). The ratio of aromatic to aliphatic protons is 5 to 3. An aliphatic ratio of 2 to 1 is predicted based on the protons labeled α and b respectively in FIG. 1. This ratio was also observed when the two aliphatic peaks were integrated separately.

For the ethylene/styrene interpolymers, the $^1$H NMR spectra using a delay time of one second, had integrals $C_{7.1}$, $C_{6.6}$, and $C_{al}$ defined, such that the integration of the peak at 7.1 ppm included all the aromatic protons of the copolymer as well as the o & p protons of aPS. Likewise, integration of the aliphatic region $C_{al}$ in the spectrum of the interpolymers included aliphatic protons from both the aPS and the interpolymer with no clear baseline resolved signal from either polymer. The integral of the peak at 6.6 ppm $C_{6.6}$ is resolved from the other aromatic signals and it is believed to be due solely to the aPS homopolymer (probably the meta protons). (The peak assignment for atactic polystyrene at 6.6 ppm (integral $A_{6.6}$) was made based upon comparison to the authentic sample Styron™ 680 (available from and a registered trademark of the Dow Chemical Company, Midland, Mich.)). This is a reasonable assumption since, at very low levels of atactic polystyrene, only a very weak signal is observed here. Therefore, the phenyl protons of the copolymer must not contribute to this signal. With this assumption, integral $A_{6.6}$ becomes the basis for quantitatively determining the aPS content.

The following equations were then used to determine the degree of styrene incorporation in the ethylene/styrene interpolymer samples:

(C Phenyl)=$C_{7.1}+A_{7.1}-(1.5 \times A_{6.6})$ (C Aliphatic)=$C_{al}-(15 \times A_{6.6})$ $S_c$=(C Phenyl)/5

$e_c$=(C Aliphatic$-(3 \times s_c))/4$

E=$e_c/(e_c+s_c)$ $S_c=s_c/(e_c+s_c)$ and the following equations were used to calculate the mol % ethylene and styrene in the interpolymers.

$$\text{Wt \% } E = \frac{E*28}{(E*28)+(S_c*104)}(100)$$

and $$\text{Wt \% } S = \frac{S_c*104}{(E*28)+(S_c*104)}(100)$$

where: $s_c$ and $e_c$ are styrene and ethylene proton fractions in the interpolymer, respectively, and $S_c$ and E are mole fractions of styrene monomer and ethylene monomer in the interpolymer, respectively.

The weight percent of aPS in the interpolymers was then determined by the following equation:

$$\text{Wt \% } aPS = \frac{(\text{Wt \% } S)*\left(\frac{A_{6.6}/2}{S_c}\right)}{100+\left[(\text{Wt \% } S)*\left(\frac{A_{6.6}/2}{S_c}\right)\right]}*100$$

the total styrene content was also determined by quantitative Fourier Transform Infrared spectroscopy (FTIR).

Preparation of ESI Interpolymers Used in Examples and Comparative Experiments of Present Invention 1) Preparation of ESI #'s 1–6

ESI #'s 1–6 are substantially random ethylene/styrene interpolymers prepared using the following catalyst and polymerization procedures.

Preparation of Catalyst A (dimethyl[N-(1,1-dimethylethyl)-1,1-[(1,2,3,4,5-η)-1,5,6,7-tetrahydro-3-phenyl-s-indacen-1-yl]silanaminato(2-)-N]-titanium)

1) Preparation of 3,5,6,7-Tetrahydro-s-Hydrindacen-1(2H)-one

Indan (94.00 g, 0.7954 moles) and 3-chloropropionyl chloride (100.99 g, 0.7954 moles) were stirred in $CH_2Cl_2$ (300 mL) at 0° C. as $AlCl_3$ (130.00 g, 0.9750 moles) was added slowly under a nitrogen flow. The mixture was then allowed to stir at room temperature for 2 hours. The volatiles were then removed. The mixture was then cooled to 0° C. and concentrated $H_2SO_4$ (500 mL) slowly added. The forming solid had to be frequently broken up with a spatula as stirring was lost early in this step. The mixture was then left under nitrogen overnight at room temperature. The mixture was then heated until the temperature readings reached 90° C. These conditions were maintained for a 2 hour period of time during which a spatula was periodically used to stir the mixture. After the reaction period crushed ice was placed in the mixture and moved around. The mixture was then transferred to a beaker and washed intermittently with $H_2O$ and diethylether and then the fractions filtered and combined. The mixture was washed with $H_2O$ (2×200 mL). The organic layer was then separated and the volatiles removed. The desired product was then isolated via recrystallization from hexane at 0° C. as pale yellow crystals (22.36 g, 16.3% yield).

$^1$H NMR ($CDCl_3$): d2.04–2.19 (m, 2 H), 2.65 (t, $^3J_{HH}$=5.7 Hz, 2 H), 2.84–3.0 (m, 4 H), 3.03 (t, $^3J_{HH}$=5.5 Hz, 2 H), 7.26 (s, 1 H), 7.53 (s, 1 H).

$^{13}$C NMR ($CDCl_3$): d25.71, 26.01, 32.19, 33.24, 36.93, 118.90, 122.16, 135.88, 144.06, 152.89, 154.36, 206.50. GC-MS: Calculated for $C_{12}H_{12}O$ 172.09, found 172.05.

2) Preparation of 1,2,3,5-Tetrahydro-7-phenyl-s-indacen.

3,5,6,7-Tetrahydro-s-Hydrindacen-1(2H)-one (12.00 g, 0.06967 moles) was stirred in diethylether (200 mL) at 0° C. as PhMgBr (0.105 moles, 35.00 mL of 3.0 M solution in diethylether) was added slowly. This mixture was then allowed to stir overnight at room temperature. After the reaction period the mixture was quenched by pouring over ice. The mixture was then acidified (pH=1) with HCl and stirred vigorously for 2 hours. The organic layer was then separated and washed with $H_2O$ (2×100 mL) and then dried over $MgSO_4$. Filtration followed by the removal of the volatiles resulted in the isolation of the desired product as a dark oil (14.68 g, 90.3% yield).

$^1$H NMR ($CDCl_3$) d2.0–2.2 (m, 2 H), 2.8–3.1 (m, 4 H), 6.54 (s, 1H), 7.2–7.6 (m, 7 H). GC-MS: Calculated for $C_{18}H_{16}$ 232.13, found 232.05.

3) Preparation of 1,2,3,5-Tetrahydro-7-phenyl-s-indacene, dilithium salt.

1,2,3,5-Tetrahydro-7-phenyl-s-indacen (14.68 g, 0.06291 moles) was stirred in hexane (150 mL) as nBuLi (0.080 moles, 40.00 mL of 2.0 M solution in cyclohexane) was slowly added. This mixture was then allowed to stir overnight. After the reaction period the solid was collected via suction filtration as a yellow solid which was washed with hexane, dried under vacuum, and used without further purification or analysis (12.2075 g, 81.1% yield).

4) Preparation of Chlorodimethyl(1,5,6,7-tetrahydro-3-phenyl-s-indacen-1-yl)silane. 1,2,3,5-Tetrahydro-7-phenyl-s-indacene, dilithium salt (12.2075 g, 0.05102 moles) in THF (50 mL) was added dropwise to a solution of $Me_2SiCl_2$ (19.5010 g, 0.1511 moles) in THF (100 mL) at 0° C. This mixture was then allowed to stir at room temperature overnight. After the reaction period the volatiles were removed and the residue extracted and filtered using hexane. The removal of the hexane resulted in the isolation of the desired product as a yellow oil (15.1492 g, 91.1% yield).

$^1$H NMR ($CDCl_3$): d0.33 (s, 3 H), 0.38 (s, 3 H), 2.20 (p, $^3J_{HH}$=7.5 Hz, 2 H), 2.9–3.1 (m, 4 H), 3.84 (s, 1 H), 6.69 (d, $^3J_{HH}$=2.8 Hz, 1 H), 7.3–7.6 (m, 7 H), 7.68 (d , $^3J_{HH}$=7.4 Hz, 2 H).

$^{13}$C NMR ($CDCl_3$): d0.24, 0.38, 26.28, 33.05, 33.18, 46.13, 116.42, 119.71, 127.51, 128.33, 128.64, 129.56, 136.51, 141.31, 141.86, 142.17, 142.41, 144.62. GC-MS: Calculated for $C_{20}H_{21}ClSi$ 324.11, found 324.05.

5) Preparation of N-(1,1-Dimethylethyl)-1,1-dimethyl-1-(1,5,6,7-tetrahydro-3-phenyl-s-indacen-1-yl)silanamine.

Chlorodimethyl(1,5,6,7-tetrahydro-3-phenyl-s-indacen-1-yl)silane (10.8277 g, 0.03322 moles) was stirred in hexane (150 mL) as $NEt_3$ (3.5123 g, 0.03471 moles) and t-butylamine (2.6074 g, 0.03565 moles) were added. This mixture was allowed to stir for 24 hours. After the reaction period the mixture was filtered and the volatiles removed resulting in the isolation of the desired product as a thick red-yellow oil (10.6551 g, 88.7% yield).

$_1$H NMR ($CDCl_3$): d0.02 (s, 3 H), 0.04 (s, 3 H), 1.27 (s, 9 H), 2.16 (p, $^3J_{HH}$=7.2 Hz, 2 H), 2.9–3.0 (m, 4 H), 3.68 (s, 1 H), 6.69 (s, 1 H), 7.3–7.5 (m, 4 H), 7.63 (d, $^3J_{HH}$=7.4 Hz, 2 H).

$^{13}$C NMR ($CDCl_3$): d−0.32, −0.09, 26.28, 33.39, 34.11, 46.46, 47.54, 49.81, 115.80, 119.30, 126.92, 127.89, 128.46, 132.99, 137.30, 140.20, 140.81, 141.64, 142.08, 144.83.

6) Preparation of N-(1,1-Dimethylethyl)-1,1-dimethyl-1-(1,5,6,7-tetrahydro-3-phenyl-s-indacen-1-yl) silanamine, dilithium salt.

N-(1,1-Dimethylethyl)-1,1-dimethyl-1-(1,5,6,7-tetrahydro-3-phenyl-s-indacen-1-yl)silanamine (10.6551 g, 0.02947 moles) was stirred in hexane (100 mL) as nBuLi (0.070 moles, 35.00 mL of 2.0 M solution in cyclohexane)

was added slowly. This mixture was then allowed to stir overnight during which time no salts crashed out of the dark red solution. After the reaction period the volatiles were removed and the residue quickly washed with hexane (2×50 mL). The dark red residue was then pumped dry and used without further purification or analysis (9.6517 g, 87.7% yield).

7) Preparation of Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium N-(1,1-Dimethylethyl)-1,1-dimethyl-1-(1,5,6,7-tetrahydro-3-phenyl-s-indacen-1-yl)silanamine, dilithium salt (4.5355 g, 0.01214 moles) in THF (50 mL) was added dropwise to a slurry of $TiCl_3(THF)_3$ (4.5005 g, 0.01214 moles) in THF (100 mL). This mixture was allowed to stir for 2 hours. $PbCl_2$ (1.7136 g, 0.006162 moles) was then added and the mixture allowed to stir for an additional hour. After the reaction period the volatiles removed and the residue extracted and filtered using toluene. Removal of the toluene resulted in the isolation of a dark residue. This residue was then slurried in hexane and cooled to 0° C. The desired product was then isolated via filtration as a red-brown crystalline solid (2.5280 g, 43.5% yield).

$^1$H NMR ($CDCl_3$): d0.71 (s, 3 H), 0.97 (s, 3 H), 1.37 (s, 9 H), 2.0–2.2 (m, 2 H), 2.9–3.2 (m, 4 H), 6.62 (s, 1 H), 7.35–7.45 (m, 1 H), 7.50 (t,$^3J_{HH}$=7.8 Hz, 2 H), 7.57 (s, 1 H), 7.70 (d, $^3J_{HH}$=7.1 Hz, 2 H), 7.78 (s, 1 H).

$^1$H NMR ($C_6D_6$): d0.44 (s, 3 H), 0.68 (s, 3 H), 1.35 (s, 9 H), 1.6–1.9 (m, 2 H), 2.5–3.9 (m, 4 H), 6.65 (s, 1 H), 7.1–7.2 (m, 1 H), 7.24 (t, $^3J_{HH}$=7.1 Hz, 2 H), 7.61 (s, 1 H), 7.69 (s, 1 H), 7.77–7.8 (m, 2 H).

$^{13}$C NMR ($CDCl_3$): d1.29, 3.89, 26.47, 32.62, 32.84, 32.92, 63.16, 98.25, 118.70, 121.75, 125.62, 128.46, 128.55, 128.79, 129.01, 134.11, 134.53, 136.04, 146.15, 148.93.

$^{13}$C NMR ($C_6D_6$): d0.90, 3.57, 26.46, 32.56, 32.78, 62.88, 98.14, 119.19, 121.97, 125.84, 127.15, 128.83, 129.03, 129.55, 134.57, 135.04, 136.41, 136.51, 147.24, 148.96.

8) Preparation of Dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium Dichloro[N-(1,1-dimethylethyl)-1,1-dimethyl-1-[(1,2,3,4,5-η)-1,5,6,7-tetrahydro-3-phenyl-s-indacen-1-yl]silanaminato(2-)-N]titanium (0.4970 g, 0.001039 moles) was stirred in diethylether (50 mL) as MeMgBr (0.0021 moles, 0.70 mL of 3.0 M solution in diethylether) was added slowly. This mixture was then stirred for 1 hour. After the reaction period the volatiles were removed and the residue extracted and filtered using hexane. Removal of the hexane resulted in the isolation of the desired product as a golden yellow solid (0.4546 g, 66.7% yield).

$^1$H NMR ($C_6D_6$): d0.071 (s, 3 H), 0.49 (s, 3 H), 0.70 (s, 3 H), 0.73 (s, 3 H), 1.49 (s, 9 H), 1.7–1.8 (m, 2 H), 2.5–2.8 (m, 4 H), 6.41 (s, 1 H), 7.29 (t, $^3J_{HH}$=7.4 Hz, 2 H), 7.48 (s, 1 H), 7.72 (d, $^3J_{HH}$=7.4 Hz, 2 H), 7.92 (s, 1 H).

$^{13}$C NMR ($C_6D_6$): d2.19, 4.61, 27.12, 32.86, 33.00, 34.73, 58.68, 58.82, 118.62, 121.98, 124.26, 127.32, 128.63, 128.98, 131.23, 134.39, 136.38, 143.19, 144.85.

Preparation of Catalyst B;(1H-cyclopenta[1]phenanthrene-2-yl)dimethyl(t-butylamido)-silanetitanium 1,4-diphenylbutadiene)

1) Preparation of lithium 1H-cyclopenta[1]phenanthrene-2-yl

To a 250 ml round bottom flask containing 1.42 g (0.00657 mole) of 1 H cyclopenta[1]phenanthrene and 120 ml of benzene was added dropwise, 4.2 ml of a 1.60 M solution of n-BuLi in mixed hexanes. The solution was allowed to stir overnight. The lithium salt was isolated by filtration, washing twice with 25 ml benzene and drying under vacuum. Isolated yield was 1.426 g (97.7 percent). 1 H NMR analysis indicated the predominant isomer was substituted at the 2 position.

2) Preparation of (1H-cyclopenta[1]phenanthrene-2-yl)dimethylchlorosilane

To a 500 ml round bottom flask containing 4.16 g (0.0322 mole) of dimethyldichlorosilane ($Me_2SiCl_2$) and 250 ml of tetrahydrofuran (THF) was added dropwise a solution of 1.45 g (0.0064 mole) of lithium 1H-cyclopenta[1]phenanthrene-2-yl in THF. The solution was stirred for approximately 16 hours, after which the solvent was removed under reduced pressure, leaving an oily solid which was extracted with toluene, filtered through diatomaceous earth filter aid (Celite™), washed twice with toluene and dried under reduced pressure. Isolated yield was 1.98 g (99.5 percent).

3. Preparation of (1H-cyclopenta[1]phenanthrene-2-yl)dimethyl(t-butylamino)silane To a 500 ml round bottom flask containing 1.98 g (0.0064 mole) of (1H-cyclopenta[1]phenanthrene-2-yl)dimethylchlorosilane and 250 ml of hexane was added 2.00 ml (0.0160 mole) of t-butylamine. The reaction mixture was allowed to stir for several days, then filtered using diatomaceous earth filter aid (Celite™), washed twice with hexane. The product was isolated by removing residual solvent under reduced pressure. The isolated yield was 1.98 g (88.9 percent).

4. Preparation of dilithio (1H-cyclopenta[1]phenanthrene-2-yl)dimethyl(t-butylamido)silane To a 250 ml round bottom flask containing 1.03 g (0.0030 mole) of (1H-cyclopenta[1]phenanthrene-2-yl)dimethyl(t-butylamino)silane and 120 ml of benzene was added dropwise 3.90 ml of a solution of 1.6 M n-BuLi in mixed hexanes. The reaction mixture was stirred for approximately 16 hours. The product was isolated by filtration, washed twice with benzene and dried under reduced pressure. Isolated yield was 1.08 g (100 percent).

5. Preparation of (1H-cyclopenta[1]phenanthrene-2-yl)dimethyl(t-butylamido)silanetitanium dichloride To a 250 ml round bottom flask containing 1.17 g (0.0030 mole) of $TiCl_3 \cdot 3THF$ and about 120 ml of THF was added at a fast drip rate about 50 ml of a THF solution of 1.08 g of dilithio (1H-cyclopenta[1]phenanthrene-2-yl)dimethyl(t-butylamido)silane. The mixture was stirred at about 20° C. for 1.5 h at which time 0.55 gm (0.002 mole) of solid $PbCl_2$ was added. After stirring for an additional 1.5 h the THF was removed under vacuum and the reside was extracted with toluene, filtered and dried under reduced pressure to give an orange solid. Yield was 1.31 g (93.5 percent).

6. Preparation of (1H-cyclopenta[1]phenanthrene-2-yl)dimethyl(t-butylamido)silanetitanium 1,4-diphenylbutadiene To a slurry of (1H-cyclopenta[1]phenanthrene-2-yl)dimethyl(t-butylamido)silanetitanium dichloride (3.48 g, 0.0075 mole) and 1.551 gm (0.0075 mole) of 1,4-diphenylbutadiene in about 80 ml of toluene at 70° C. was add 9.9 ml of a 1.6 M solution of n-BuLi (0.0150 mole). The solution immediately darkened. The temperature was increased to bring the mixture to reflux and the mixture was maintained at that temperature for 2 hrs. The mixture was cooled to about −20° C. and the volatiles were removed under reduced pressure. The residue was slurried in 60 ml of mixed hexanes at about 20° C. for approximately 16 hours. The mixture was cooled to about −25° C. for about 1 h. The solids were collected on a glass frit by vacuum filtration and dried under reduced pressure. The dried solid was placed in a glass fiber thimble and solid extracted continuously with hexanes using a soxhlet extractor. After 6 h a crystalline solid was observed in the boiling pot. The mixture was cooled to about −20° C., isolated by filtration from the cold mixture and dried under reduced pressure to give 1.62 g of a dark crystalline solid. The filtrate was discarded. The solids in the extractor were stirred and the extraction continued with an additional quantity of mixed hexanes to give an additional 0.46 gm of the desired product as a dark crystalline solid.

Preparation of Cocatalyst E, (Bis(hydrogenated-tallowalkyl)methylamine

Methylcyclohexane (1200 mL) was placed in a 2 L cylindrical flask. While stirring, bis(hydrogenated-tallowalkyl)methylamine (ARMEEN® M2HT, 104 g, ground to a granular form) was added to the flask and stirred until completely dissolved. Aqueous HCl (1M, 200 mL) was added to the flask, and the mixture was stirred for 30 minutes. A white precipitate formed immediately. At the end of this time, $LiB(C_6F_5)_4 \cdot Et_2O \cdot 3LiCi$ (Mw=887.3; 177.4 g) was added to the flask. The solution began to turn milky white. The flask was equipped with a 6" Vigreux column topped with a distillation apparatus and the mixture was heated (140° C. external wall temperature). A mixture of ether and methylcyclohexane was distilled from the flask. The two-phase solution was now only slightly hazy. The mixture was allowed to cool to room temperature, and the contents were placed in a 4 L separatory funnel. The aqueous layer was removed and discarded, and the organic layer was washed twice with $H_2O$ and the aqueous layers again discarded. The $H_2O$ saturated methylcyclohexane solutions were measured to contain 0.48 wt percent diethyl ether ($Et_2O$).

The solution (600 mL) was transferred into a 1 L flask, sparged thoroughly with nitrogen, and transferred into the drybox. The solution was passed through a column (1" diameter, 6" height) containing 13× molecular sieves. This reduced the level of $Et_2O$ from 0.48 wt percent to 0.28 wt percent. The material was then stirred over fresh 13× sieves (20 g) for four hours. The $Et_2O$ level was then measured to be 0.19 wt percent. The mixture was then stirred overnight, resulting in a further reduction in $Et_2O$ level to approximately 40 ppm. The mixture was filtered using a funnel equipped with a glass frit having a pore size of 10–15 μm to give a clear solution (the molecular sieves were rinsed with additional dry methylcyclohexane). The concentration was measured by gravimetric analysis yielding a value of 16.7 wt percent.

Polymerization

ESI #'s 1–6 were prepared in a 6 gallon (22.7 L), oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a micromotion flow meter that measured flow and solution density. All lines on the exit of the reactor were traced with 50 psi (344.7 kPa) steam and insulated.

Toluene solvent was supplied to the reactor at 30 psig (207 kPa). The feed to the reactor was measured by a Micro-Motion mass flow meter. A variable speed diaphragm pump controlled the feed rate. At the discharge of the solvent pump, a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of micro-flow needle valves. Uninhibited styrene monomer was supplied to the reactor at 30 psig (207 kpa). The feed to the reactor was measured by a Micro-Motion mass flow meter. A variable speed diaphragm pump controlled the feed rate. The styrene stream was mixed with the remaining solvent stream. Ethylene was supplied to the reactor at 600 psig (4,137 kPa). The ethylene stream was measured by a Micro-Motion mass flow meter just prior to the Research valve controlling flow. A Brooks flow meter/controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also entered the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the top of the devolatilizer. The stream was condensed with a glycol jacketed exchanger and entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

The various catalysts, co-catalysts and process conditions used to prepare the various individual ethylene styrene interpolymers (ESI #'s 1–6) are summarized in Table 1 and their properties are summarized in Table 2.

TABLE 1

Preparation Conditions for ESI #'s 1–6

| ESI # | Reactor Temp °C. | Solvent Flow lb/hr | Ethylene Flow lb/hr | Hydrogen Flow lb/hr | Styrene Flow lb/hr | Ethylene Conversion % | B/Ti Ratio | MMAO$^f$/Ti Ratio | Catalyst | Co-Catalyst |
|---|---|---|---|---|---|---|---|---|---|---|
| ESI 1 | 93.0 | 33.8 | 3.10 | 16.0 | 5.4 | 95.3 | 3.00 | 7.0 | A$^a$ | D$^d$ |
| ESI 2 | 69.0 | 30.0 | 1.30 | 0 | 10.0 | 87.0 | 3.00 | 5.0 | B$^b$ | D$^d$ |
| ESI 3 | 71.5 | 30.0 | 1.30 | 0 | 15.8 | 96.6 | 3.00 | 4.0 | A$^a$ | D$^d$ |
| E5I 4 | 100.1 | 18.9 | 1.99 | 4.3 | 7.0 | 85.12 | 1.25 | 10.0 | C$^c$ | E$^e$ |
| ESI 5 | 73.6 | 15.9 | 1.21 | 2.8 | 8.5 | 89.08 | 1.25 | N/A | C$^c$ | E$^e$ |
| ESI 6 | 91.1 | 29.9 | 2.90 | 21.0 | 9.0 | 91.92 | 1.26 | 10.0 | A$^a$ | E$^e$ |

N/A = not available
$^a$Catalyst A is dimethyl[N-(1,1-dimethylethyl)-1,1-dimethyl-1-[(1,2,3,4,5-η)-1,5,6,7-tetrahydro-3-phenyl-s-indacen-1-yl]silanaminato(2-)-N]-titanium.
$^b$Catalyst B is (1H-cyclopenta[l]phenanthrene-2-yl)dimethyl(t-butylamido)-silanetitanium 1,4-diphenylbutadiene)
$^c$Catalyst C is (t-butylamido)dimethyl(tetramethylcyclopentadienyl)silane-titanium (II) 1,3-pentadiene prepared as described in U.S. Pat. No. 5,556,928, Example 17
$^d$Cocatalyst D is tris(pentafluorophenyl)borane, (CAS # 001109-15-5),
$^e$Cocatalyst E is bis-hydrogenated tallowalkyl methylammonium tetrakis(pentafluorophenyl)borate.
$^f$a modified methylaluminoxane commercially available from Akzo Nobel as MMAO-3A (CAS # 146905-79-5)

TABLE 2

Properties of ESI #'s 1–6

| ESI # | ESI Styrene (wt %) | ESI Styrene (mol %) | Atactic Polystyrene (wt %) | Gottfert No, (cm$^3$/10 min) | $10^3$ M$_w$ | M$_w$/M$_n$ Ratio |
|---|---|---|---|---|---|---|
| ESI 1 | 40.3 | 15.4 | 0.5 | 1.4 | 115 | 1.8 |
| ESI 2 | 69.8 | 38.4 | 5.6 | 0.9 | 190 | 3.0 |
| ESI 3 | 74.6 | 43.6 | 8.3 | 1.3 | N/A | N/A |
| ESI 4 | 30.3 | 10.5 | 5.9 | 1.6 | N/A | N/A |
| ESI 5 | 56.9 | 26.2 | 8.3 | 1.2 | 255 | 6.6 |
| ESI 6 | 43.6 | 17.2 | 2.0 | 1.0 | 133 | 3.1 |

N/A = Not Available

Example 1

A sample ESI 1 containing 15.4 mol % styrene (40.3 wt %) and having a Gottfert melt index (G#) of 1.4 cm$^3$/10 min was fabricated into film using a 1.25 in diameter extruder with a 12/6/6 24:1 L/D screw operating at a melt temperature of about 415° F., The die was 3" in diameter with a 60 mil die gap. (the extrusion conditions are summarized in Table 3). The film (having a thickness of 1–3 mils) was submitted for % recovery testing as a measure of elastic film properties as described herein. The results are summarized in Table 4 and demonstrate the desired % recovery of greater than 80% in the CD and greater than about 60% in the MD.

Example 2

A sample ESI 2 containing 38.4 mol % styrene (69.8 wt %) and having a Gottfert melt index (G#) of 0.9 cm$^3$/10 min was fabricated into film and tested as for Example 1. The results are summarized in Table 4 and demonstrate the desired % recovery of greater than 80% in the CD and greater than about 60% in the MD.

Example 3

A sample ESI 5 containing 26.2 mol % styrene (56.9 wt %) and having a Gottfert melt index (G#) of 1.2 cm$^3$/10 min was fabricated into film and tested as for Example 1. The results are summarized in Table 4 and demonstrate the desired % recovery of greater than 80% in the CD and greater than about 60% in the MD.

Example 4

A sample ESI 6 containing 17.2 mol % styrene (43.6 wt %) and having a Gottfert melt index (G#) of 1.0 cm$^3$/10 min was fabricated into film and tested as for Example 1. The results are summarized in Table 4 and demonstrate the desired % recovery of greater than 80% in the CD and greater than about 60% in the MD.

Example 5

A sample ESI 4 containing 10.5 mol % styrene (30.3 wt %) and having a Gottfert melt index (G#) of 1.6 cm$^3$/10 min was fabricated into film and tested as for Example 1. The results are summarized in Table 4 and demonstrate the desired % recovery of greater than 80% in the CD and greater than 60% in the MD.

Comparative Experiment 1

A sample ESI 3 containing 43.6 mol % styrene (74.6 wt %) and having a Gottfert melt index (G#) of 1.3 cm$^3$/10 min was fabricated into film and tested as for Example 1. The results are summarized in Table 4 and do not demonstrate the desired % recovery of greater than 80% in the CD and greater than 60% in the MD.

Comparative Experiment 2

This was a film made from Affinity™ PL 1880, a substantially linear ethylene/1-octene interpolymer available from the Dow Chemical Company, prepared using a metallocene catalyst, and having melt index, I$_2$=1.6 g/10 min, a density=0.8965 g/cm$^3$ a an I$_{10}$/I$_2$ of 10 and containing 500 ppm Irganox™ 1076 and 800 ppm PEPQ™ and submitted to the % recovery as described herein. The results are summarized in Table 4 and do not demonstrate the desired % recovery of greater than 80% in the CD and greater than 60% in the MD.

Comparative Experiment 3

This was a film made from Attane™ 4201, an ethylene/1-octene interpolymer available from the Dow Chemical Company, having melt index, $I_2$=1.0 g/10 min, a density= 0.912 g/cm³ a an $I_{10}/I_2$ of 8.5 and submitted to the % recovery tests as described herein. The results are summarized in Table 4 and do not demonstrate the desired % recovery of greater than 80% in the CD and greater than 60% in the MD.

TABLE 3

Fabrication Conditions of Films of Example #'s 1–5 and Comparative Experiments 1–3.

|  | Ex. 1 | Ex. 2 | Ex. 3 | Ex. 4 | Ex. 5 | Comp. Expt. 1 | Comp. Expt. 2 | Comp. Expt. 3 |
|---|---|---|---|---|---|---|---|---|
| Zone #1 set. pt, F. | 260 | 270 | 250 | 275 | 275 | 270 | N/A | N/A |
| Zone #2 set. pt., F. | 370 | 370 | 325 | 350 | 350 | 370 | N/A | N/A |
| Zone #3 set. pt., F. | 380 | 380 | 351 | 385 | 375 | 380 | N/A | N/A |
| Large flange set. pt., F. | 380 | 380 | 384 | — | 373 | 380 | N/A | N/A |
| Adapter set pt., F. | 380 | 380 | 370 | 399 | 369 | 380 | N/A | N/A |
| Die 1 set pt, F. | 380 | 385 | 376 | 400 | 379 | 385 | N/A | N/A |
| Die 2 set pt, F. | 380 | 385 | 374 | 400 | 375 | 385 | N/A | N/A |
| Melt temp., F. | 417 | 412 | 418 | 341 | 433 | 415 | N/A | N/A |
| Extruder Press, psig | 3170 | 3590 | 2730 | 2790 | 2460 | 2390 | N/A | N/A |
| Screw Speed rpm | 50.1 | 50.1 | 50.1 | 49.7 | 50.1 | 50.1 | N/A | N/A |
| Extruder amps | 16.7 | 18 | 16 | 13 | 17 | 15.5 | N/A | N/A |
| Nip Roll Speed, ft/min | 16.6 | 16.6 | 26 | 20 | 26 | 16.6 | N/A | N/A |

Test Methods

Elastic Recovery MD (machine direction) sample dimension is 25 mm wide in CD (cross direction) and 127 mm long in MD. Elastic Recovery: CD (cross direction) sample dimension is 25 mm wide in MD (machine direction) and 127 mm long in CD. Thus a sample is pulled on a tensile testing machine with a 50 mm gauge length setting at 250 mm/min to 100% of its original length. The sample is then held at that elongation for 30 seconds. The sample is then unloaded at the same speed to the original 50 mm gauge length. After a 60 second hold, sample is pulled again to determine the point at which it exerts a force again. The % recovery: (average of five measurements) is obtained initially measuring the % elongation or percent set. This is obtained by measuring the distance to where the second load cycle begins to show a non-zero force reading. This distance is the percent set or % elongation where;

% elongation=(elongated length−original length)/original length×100/1.

The % recovery is then calculated as;

% recovery=(100−% elongation).

The films of the present invention possess good elasticity shown by their having ≧80% recovery in the CD and ≧60% recovery in the MD.

TABLE 4

% Recovery as an Indication of Elastic Film Properties of Examples #'s 1–5 and Comparative Experiments 1–3

| Example # | ESI # | ESI Styrene (mol %) | % Recovery (CD) | % Recovery (MD) |
|---|---|---|---|---|
| Ex. 1 | ESI 1 | 15.4 | 93 | 95 |
| Ex. 2 | ESI 2 | 38.4 | 95 | 80 |
| Ex. 3 | ESI 5 | 26.2 | 92 | 72 |
| Ex. 4 | ESI 6 | 17.2 | 95 | 95 |

TABLE 4-continued

% Recovery as an Indication of Elastic Film Properties of Examples #'s 1–5 and Comparative Experiments 1–3

| Example # | ESI # | ESI Styrene (mol %) | % Recovery (CD) | % Recovery (MD) |
|---|---|---|---|---|
| Ex. 5 | ESI 4 | 10.5 | 80 | 77 |
| Comp. Expt 1 | ESI 3 | 43.6 | 29 | 23 |
| Comp. Expt 2 | N/A | N/A | 70 | 69 |
| Comp. Expt 3 | N/A | N/A | 65 | 62 |

Examples 1 and 4 both show excellent film elasticity with high recovery in both the CD and MD. Examples 2 and 3 also show good elasticity having high recovery in the CD and acceptable recovery in the MD. Example 5 shows acceptable recovery in both the CD and MD. Comparative Example 1 shows poor elasticity and has low recovery in the both the CD and MD due to the high styrene content. Comparative Examples 2 and 3 also shows poor elasticity and a low recovery in the CD and MD.

TABLE 5

Film Properties of Examples #'s 3–4

|  | Ex. 3 | Ex. 4 |
|---|---|---|
| Secant Modulus (Mpsi) | | |
| 1% Secant, MD, (Mpsi) | 6.3 | 0.7 |
| 1% Secant, CD, (Mpsi) | 0.8 | 0.8 |
| 2% Secant, MD, (Mpsi) | 6.3 | 0.7 |

TABLE 5-continued

Film Properties of Examples #'s 3–4

| | Ex. 3 | Ex. 4 |
|---|---|---|
| 2% Secant, CD, (Mpsi) | 0.8 | 0.8 |
| Film Tensiles | | |
| Tensile Yield, MD (psi) | 556 | 179 |
| Ult. Tensile, MD (psi) | 1286 | 2000 |
| Ult. Elongation, MD (%) | 337 | 448 |
| Tensile Toughness, MD (ft-lb/cu. in) | 238 | 207 |
| Tensile Yield, CD (psi) | 232 | 216 |
| Ult. Tensile, CD (psi) | 1317 | 1308 |
| Ult. Elongation, CD (%) | 354 | 471 |
| Tensile Toughness, CD (ft-lb/cu. in) | 155 | 174 |

The data in Table 5 demonstrate the good tensile strength and elongation of the elastic films of the present invention and their softness and flexibility as indicated by their low modulus values.

What is claimed is:

1. An elastic film having at least one layer comprising a blend of;

(A) at least one substantially random interpolymer, which comprises;
  (1) polymer units derived from;
    (i) at least one aliphatic or cycloaliphatic vinyl or vinylidene monomer, or
    (ii) a combination of at least one aromatic vinyl monomer and at least one aliphatic or cycloaliphatic vinyl or vinylidene monomer, and
  (2) polymer units derived from at least one $C_{2-20}$ α-olefin; and optionally
  (3) polymer units derived from one or more ethylenically unsaturated polymerizable monomers other than those of (1) and (2); and (B) at least one polymer other than that of Component A; and wherein said elastic film has a recovery in the cross direction of greater than or equal to about 80% and has a recovery in the machine direction of greater than or equal to about 60%.

2. The elastic film of claim 1 wherein;

(I) said substantially random interpolymer, Component A, is present in an amount from about 50 to 100 wt %, based on the combined weights of Components A and said polymer other than that of Component A, and has an $I_2$ of about 0.1 to about 1,000 g/10 min and an $M_w/M_n$ of about 1.5 to about 20, and comprises;
  (1) from about 10 to about 40 mol % of polymer units derived from;
    (i) at least one aliphatic or cycloaliphatic vinyl or vinylidene monomer, or
    (ii) a combination of at least one aromatic vinyl monomer and at least one aliphatic or cycloaliphatic vinyl or vinylidene monomer, and
  (2) from about 60 to about 90 mol % of polymer units derived from at least one $C_{2-20}$ α-olefin; and
  (3) from 0 to about 20 mol % of polymer units derived from one or more of said ethylenically unsaturated polymerizable monomers other than those derived from (1) and (2); and (II) said polymer other than that of Component A is present in an amount from 0 to about 50 wt %, based on the combined weights of Components A and said polymer other than that of Component A.

3. The elastic film of claim 1 wherein;

(I) said substantially random interpolymer Component (A) is present in an amount of about 75 to 100 wt %, based on the combined weights of Components A and said polymer other than that of Component A and has an $I_2$ of about 0.5 to about 200 g/10 min and an $M_w/M_n$ of about 1.8 to about 10; and comprises
  (1) from about 13 to about 33 mol % of polymer units derived from,
    (i) said aliphatic or cycloaliphatic vinyl or vinylidene monomer is represented by the following general formula;

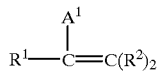

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms; each $R^2$ is independently selected from the group of radicals consisting of hydrogen and alkyl radicals containing from 1 to about 4 carbon atoms; or alternatively $R^1$ and $A^1$ together form a ring system; and
  (2) from about 67 to about 87 mol % of polymer units derived from said α-olefin which comprises ethylene, or ethylene and at least one of propylene, 4-methyl-1-pentene, butene-1, hexene-1 or octene-1; and
  (3) said ethylenically unsaturated polymerizable monomers other than those derived from (1) and (2) comprises norbornene, or a $C_{1-10}$ alkyl or $C_{6-10}$ aryl substituted norbornene, and (II) said polymer other than that of Component A is present in amount from 0 to about 25 wt %, based on the combined weights of Components A and polymer other than that of Component A, and comprises one or more of
  a) a homogeneous interpolymer;
  b) a heterogeneous interpolymer;
  c) a thermoplastic olefin;
  d) a styrenic block copolymer;
  e) a styrenic homo- or copolymer;
  f) an elastomer;
  g) a thermoset polymer;
  h) a vinyl halide polymer; or
  i) an engineering thermoplastic.

4. The elastic film of claim 1 wherein;

(I) said substantially random interpolymer, Component (A), is present in an amount from about 90 to about 95 wt %, based on the combined weights of Components A and said polymer other than that of Component A, and has an $I_2$ of about 0.5 to about 100 g/10 min and an $M_w/M_n$ from about 2 to about 5; and comprises
  (1) from about 15 to about 29 mol % of polymer units derived from;
    (i) said aliphatic or cycloaliphatic vinyl or vinylidene monomers which comprises 5-ethylidene-2-norbornene or 1-vinylcyclo-hexene, 3-vinylcyclohexene, and 4-vinylcyclohexene;
  (2) from about 71 to about 85 mol % of polymer units derived from said α-olefin, which comprises ethylene, or ethylene and at least one of propylene, 4-methyl-1-pentene, butene-1, hexene-1 or octene-1; and optionally (3) said ethylenically unsaturated polymerizable monomers other than those derived from (1) and (2) is norbornene; and (II) said polymer other than that of Component A is present in amount from about 5 to about 10 wt %, based on the combined weights of Components A and said polymer other than that of Component A, and comprises one or more of;
a) a substantially linear ethylene/α-olefin interpolymer;
b) a heterogeneous ethylene/$C_3$–$C_8$ α-olefin interpolymer;
c) an ethylene/propylene rubber (EPM), ethylene/propylene diene monomer terpolymer (EPDM), isotactic polypropylene;
d) a styrene/ethylene-butene copolymer, a styrene/ethylene-propylene copolymer, a styrene/ethylene-butene/styrene (SEBS) copolymer, a styrene/ethylene-propylene/styrene (SEPS) copolymer;
e) the acrylonitrile-butadiene-styrene (ABS) polymers, styrene-acrylonitrile (SAN), polystyrene, high impact polystyrene;
f) polyisoprene, polybutadiene, natural rubbers, ethylene/propylene rubbers, ethylene/propylene diene (EPDM) rubbers, styrene/buta-diene rubbers, thermoplastic polyurethanes;
g) epoxies, vinyl ester resins, polyurethanes, phenolic resins;
h) homopolymers or copolymers of vinyl chloride or vinylidenechloride; or
i) poly(methylmethacrylate), polyester, nylon-6, nylon-6,6, poly(acetal); poly(amide), poly(arylate), poly(carbonate), poly(butylene) and polybutylene, polyethylene terephthalates.

5. A fabricated article comprising the elastic film of claim 1.

6. The fabricated article of claim 5 in the form of a tape, bandage, incontinence garment, disposable diaper, disposable and protective clothing and fabrics, a food wrap, meat wrap or a household wrap.

7. The elastic film of claim 1 wherein Component A is cross-linked.

8. A multilayer film comprising at least two layers wherein at least one of said layers has a recovery in the cross direction of greater than or equal to about 80% and has a recovery in the machine direction of greater than or equal to about 60% and comprises a polymer composition which comprises a blend of;

(A) at least one substantially random interpolymer, which comprises;
(1) polymer units derived from;
(i) at least one aliphatic or cycloaliphatic vinyl or vinylidene monomer, or
(ii) a combination of at least one aromatic vinyl monomer and at least one aliphatic or cycloaliphatic vinyl or vinylidene monomer, and
(2) polymer units derived from at least one $C_{2-20}$ α-olefin; and optionally,
(3) polymer units derived from one or more ethylenically unsaturated polymerizable monomers other than those of (1) and (2); or (B) at least one polymer other than that of Component A.

9. The multilayer film of claim 8 wherein;
(I) said substantially random interpolymer, Component A, is present in an amount from about 50 to 100 wt %, based on the combined weights of Components A and said polymer other than that of Component A, and has an $I_2$ of about 0.1 to about 1,000 g/10 min and an $M_w/M_n$ of about 1.5 to about 20, and comprises;

(1) from about 10 to about 40 mol % polymer units derived from;
(i) at least one aliphatic or cycloaliphatic vinyl or vinylidene monomer, or
(ii) a combination of at least one aromatic vinyl monomer and at least one aliphatic or cycloaliphatic vinyl or vinylidene monomer, and
(2) from about 60 to about 90 mol % of polymer units derived from at least one $C_{2-20}$ α-olefin; and optionally
(3) from 0 to about 20 mol % of polymer units derived from one or more of said ethylenically unsaturated polymerizable monomers other than those derived from (1) and (2); and (II) said polymer other than that of Component A is present in an amount from 0 to about 50 wt %, based on the combined weights of Components A and said polymer other than that of Component A.

10. The multilayer film of claim 8 wherein;
(I) said substantially random interpolymer Component (A) is present in an amount of about 75 to 100 wt %, based on the combined weights of Components A and said polymer other than that of Component A, and has an $I_2$ of about 0.5 to about 200 g/10 min and an $M_w/M_n$ of about 1.8 to about 10; and comprises
(1) from about 13 to about 33 mol % of polymer units derived from;
(i) said aliphatic or cycloaliphatic vinyl or vinylidene monomer is represented by the following general formula;

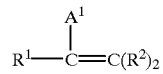

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms; each $R^2$ is independently selected from the group of radicals consisting of hydrogen and alkyl radicals containing from 1 to about 4 carbon atoms; or alternatively $R^1$ and $A^1$ together form a ring system; and
(2) from about 67 to about 87 mol % of polymer units derived from said α-olefin which comprises ethylene, or ethylene and at least one of propylene, 4-methyl-1-pentene, butene-1, hexene-1 or octene-1 and
(3) said ethylenically unsaturated polymerizable monomers other than those derived from (1) and (2) comprises norbornene, or a $C_{1-10}$ alkyl or $C_{6-10}$ aryl substituted norbornene; and (II) said polymer other than that of Component A is present in amount from 0 to about 25 wt %, based on the combined weights of Components A and said polymer other than that of Component A, and comprises one or more of
a) a homogeneous interpolymer;
b) a heterogeneous interpolymer;
c) a thermoplastic olefin;
d) a styrenic block copolymer;
e) a styrenic homo- or copolymer;
f) an elastomer;
g) a thermoset polymer;

h) a vinyl halide polymer; or i) an engineering thermoplastic.

11. The multilayer film of claim 8 wherein;

(I) said substantially random interpolymer, Component (A), is present in an amount from about 90 to about 95 wt %, based on the combined weights of Component A and said polymer other than that of Component A, and has an $I_2$ of about 0.5 to about 100 g/10 min and an $M_w/M_n$ from about 2 to about 5; and comprises (1) from about 15 to about 29 mol % of polymer units derived from;

i) said aliphatic or cycloaliphatic vinyl or vinylidene monomers which comprises 5-ethylidene-2-norbornene or 1-vinylcyclo-hexene; 3-vinylcyclohexene, and 4-vinylcyclohexene;

(2) from about 71 to about 85 mol % of polymer units derived from said α-olefin, which comprises ethylene, or ethylene and at least one of propylene, 4-methyl-1-pentene, butene-1, hexene-1 or octene-1; and optionally (3) said ethylenically unsaturated polymerizable monomers other than those derived from (1) and (2) is norbornene; and (II) said polymer other than that of Component A is present in amount from about 5 to about 10 wt %, based on the combined weights of Components A and said polymer other than that of Component A, and comprises one or more of;

a) a substantially linear ethylene/α-olefin interpolymer;

b) a heterogeneous ethylene/$C_3$–$C_8$ α-olefin interpolymer;

c) an ethylene/propylene rubber (EPM), ethylene/propylene diene monomer terpolymer (EPDM), isotactic polypropylene;

d) a styrene/ethylene-butene copolymer, a styrene/ethylene-propylene copolymer, a styrene/ethylene-butene/styrene (SEBS) copolymer, a styrene/ethylene-propylene/styrene (SEPS) copolymer;

e) the acrylonitrile-butadiene-styrene (ABS) polymers, styrene-acrylonitrile (SAN), polystyrene, high impact polystyrene;

f) polyisoprene, polybutadiene, natural rubbers, ethylene/propylene rubbers, ethylene/propylene diene (EPDM) rubbers, styrene/butadiene rubbers, thermoplastic polyurethanes;

g) epoxies, vinyl ester resins, polyurethanes, phenolic resins;

h) homopolymers or copolymers of vinyl chloride or vinylidene chloride; or i) poly(methylmethacrylate), polyester, nylon-6, nylon-6,6, poly(acetal); poly(amide), poly(arylate), poly(carbonate), poly(butylene) and polybutylene, polyethylene terephthalates.

12. A fabricated article comprising the multilayer film of claim 8.

13. The fabricated article of claim 12 in the form of a tape, bandage, incontinence garment, disposable diaper, disposable and protective clothing and fabrics, a food wrap, meat wrap or a household wrap.

14. The multilayer film of claim 8 wherein Component A is cross-linked.

15. An elastic film comprising:

at least one layer consisting of a substantially random interpolymer which comprise;

(I) polymer units derived from:

(i) at least one aliphatic or cycloaliphatic vinyl or vinylidene monomer, or (ii) a combination of at least one aromatic vinyl monomer and at least one aliphatic or cycloaliphatic vinyl or vinylidene monomer, and (2) polymer units derived from at least one $C_{2-20}$ α-olefin; and optionally (3) polymer units derived from one or more ethylenically unsaturated polymerizable monomers other than those of (1) and (2), wherein said elastic film has a recovery in the cross direction of greater than or equal to about 80% and has a recovery in the machine direction of greater than or equal to about 60%.

16. The elastic film of claim 15, further comprising at least another layer.

17. The elastic film of claim 15, wherein the vinyl aromatic monomer is represented by the following formula:

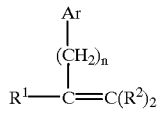

wherein $R^1$ is selected from the group of radicals consisting of hydrogen and alkyl radicals containing three carbons or less, and Ar is a phenyl group or a phenyl group substituted with from 1 to 5 substituents selected from the group consisting of halo, $C_{1-4}$-alkyl, and $C_{1-4}$-haloalkyl and n has a value from zero to about 4.

18. The elastic film of claim 15, wherein the aliphatic or cycloaliphatic vinyl or vinylidene monomer is represented by the following formula:

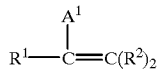

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms; each $R^2$ is independently selected from the group of radicals consisting of hydrogen and alkyl radicals containing from 1 to about 4 carbon atoms; or alternatively $R^1$ and $A^1$ together form a ring system.

19. The elastic film of claim 15, wherein the vinyl aromatic monomer is styrene, α-methyl styrene, otho-, meta-, and para-methyl styrene, or ring-halogenated styrene.

20. The elastic film of claim 15, wherein the aliphatic or cycloaliphatic vinyl or vinylidene monomer is 5-ethylidene-2-norbornene, 1-vinylcyclohexene, 3-vinylcyclohexene, or 4-vinylcyclohexene.

21. The elastic film of claim 15, wherein the substantially random interpolymer is an ethylene styrene interpolymer.

* * * * *

UNITED STATES PATENT AND TRADEMARK OFFICE
CERTIFICATE OF CORRECTION

| | |
|---|---|
| PATENT NO. | : 6,376,095 B1 |
| APPLICATION NO. | : 09/317390 |
| DATED | : April 23, 2002 |
| INVENTOR(S) | : Cheung et al. |

It is certified that error appears in the above-identified patent and that said Letters Patent is hereby corrected as shown below:

Col. 6, line 13, after "reference" please insert --to--.

Col. 6, line 28, after "hold" please insert --the--.

Col. 7, line 22, please delete "snore" and insert --more--.

Col. 7, line 26, please delete "nethylene" and insert --methylene--.

Col. 10, line 2, after "$Cp^2$" please delete ")".

Col. 10, line 41, after "of" please insert --from--.

Col. 10, line 59, please delete "$R_1'$" and insert --R'--.

Col. 10, line 62, please delete "$R^{1'}$" and insert --R'--.

Col. 11, line 46, please delete "686,687" and insert --686, 687--.

Col. 11, line 67, after "Ltd" please insert --.--.

Col. 12, line 7, please delete "al" and insert --at--.

Col. 12, line 46, after "polyethers" please delete ")".

Col. 12, line 58, before "α" please delete "(".

Col. 14, line 44, please delete "Theological" and insert --rheological--.

Col. 15, line 36, please delete "homes" and insert --boranes--.

Col. 15, line 55, please delete "dime" and insert --diene--.

Col. 17, line 25, please delete "and" and insert --an--.

Col. 18, line 32, please delete ".".

UNITED STATES PATENT AND TRADEMARK OFFICE
CERTIFICATE OF CORRECTION

PATENT NO.       : 6,376,095 B1
APPLICATION NO. : 09/317390
DATED            : April 23, 2002
INVENTOR(S)      : Cheung et al.

It is certified that error appears in the above-identified patent and that said Letters Patent is hereby corrected as shown below:

Col. 20, line 9, please delete "527-563" and insert --632-647--.

Col. 23, line 19, after "preferably from" please insert --about--.

Col. 23, line 41, please delete "/".

Col. 27, line 23, please delete "the" and insert --The--.

Col. 28, line 13, after "(CDCl$_3$)" please insert --:--.

Col. 28, line 40, please delete "$^{13}$ C" and insert --$^{13}$C--.

Col. 28, line 51, after "perior" please insert --,--.

Col. 28, line 54, please delete "$_1$H" and insert --$^1$H--.

Col. 29, line 18, after "volatiles" please insert --were--.

Col. 30, line 42, please delete "TiCl$_3$.3THF" and insert --TiCl$_3$ 3THF--.

Col. 30, line 58, please delete "add" and insert --added--.

Col. 31, line 21, please delete "LiB(C$_6$F$_5$)$_4$.Et$_2$O.3LiCi" and insert --LiB(C$_6$F$_5$)$_4$ Et$_2$O.3LiCi--.

Col. 33, line 42, after "F." please delete ",".

Col. 34, line 64, please delete "a" and insert --and--.

Col. 35, line 9, please delete "a" and insert --and--.

UNITED STATES PATENT AND TRADEMARK OFFICE
CERTIFICATE OF CORRECTION

PATENT NO. : 6,376,095 B1
APPLICATION NO. : 09/317390
DATED : April 23, 2002
INVENTOR(S) : Cheung et al.

It is certified that error appears in the above-identified patent and that said Letters Patent is hereby corrected as shown below:

Col. 42, Claim 17 was canceled in the Response to Advisory Action filed 11/26/01.

Col. 42, Claim 19 was canceled in the Response to Advisory Action filed 11/26/01.

Signed and Sealed this

Twenty-fourth Day of June, 2008

JON W. DUDAS
*Director of the United States Patent and Trademark Office*